(12) United States Patent
Marritt et al.

(10) Patent No.: US 6,242,529 B1
(45) Date of Patent: Jun. 5, 2001

(54) AQUEOUS INK JET COMPOSITIONS COMPRISING A HYDROPHOBIC POLYMER FUNCTIONALIZED POLYURONIC ACID DISPERSENT, AND METHOD OF USING

(75) Inventors: William Alan Marritt; Akio Owatari, both of Nagano (JP)

(73) Assignee: Seiko Epson Corporation, Tokyo To (JP)

( * ) Notice: Subject to any disclaimer, the term of this patent is extended or adjusted under 35 U.S.C. 154(b) by 0 days.

(21) Appl. No.: 09/160,833

(22) Filed: Sep. 25, 1998

(30) Foreign Application Priority Data

Sep. 26, 1997 (JP) .................................................. 9-261591
Jan. 8, 1998 (JP) .................................................. 10-002444

(51) Int. Cl.⁷ ........................... C09D 11/00; C08G 81/00; B01F 17/52; B41J 2/01
(52) U.S. Cl. ...................... 524/599; 525/54.24; 427/469; 347/100; 347/105

(58) Field of Search ..................... 524/599; 347/100, 347/105; 525/54.24; 427/469

(56) References Cited

U.S. PATENT DOCUMENTS 5,736,121 4/1998 Unger ..................................... 424/9.4

FOREIGN PATENT DOCUMENTS 1951458 4/1971 (DE) ............................. D06M/15/52

*Primary Examiner*—David W. Wu
*Assistant Examiner*—Kelechi C. Egwim
(74) *Attorney, Agent, or Firm*—Ladas & Parry

(57) ABSTRACT

Pigment dispersed aqueous ink jet ink compositions suitable for printing on plain paper. The ink comprises water as the principal solvent, a pigment and a pigment dispersant. The pigment dispersant is a derivative of a polyuronic acid in which a hydrophobic polymer is covalently attached to the reducing terminus of the polyuronic acid. The polyuronic acid is composed primarily of 1,4-linked polygalacturonic acid, polyguluronic acid, polyiduronic acid, or mixed polymers thereof.

22 Claims, No Drawings

AQUEOUS INK JET COMPOSITIONS COMPRISING A HYDROPHOBIC POLYMER FUNCTIONALIZED POLYURONIC ACID DISPERSENT, AND METHOD OF USING

BACKGROUND OF THE INVENTION

1. Field of the Invention

This invention relates to a pigment dispersed aqueous ink composition for use in ink jet printing which gives reliable printing performance and yields printed images which have excellent print quality.

2. Background Art

Ink jet printing is a non-impact printing process in which the printer produces droplets of ink in response to digital signals, such as those generated by a computer. The droplets of ink are deposited on a substrate such as paper or transparent films. Ink jet printers have found broad commercial acceptance due to their print quality, low cost, relatively quiet operation, and graphics capability. Thermal (bubble jet) and piezoelectric drop-on-demand printers have been especially successful in the marketplace and have found broad application as printers for personal computers in the office and the home.

The inks used in ink jet printers can be classified as either dye based inks or pigment based inks. Dye based inks are satisfactory for most applications, but generally have poor light fastness and water resistance. As a printed document is expected to have a certain degree of permanency, the lack of light fastness and water resistance of the printed image derived from dye based inks is a problem. Pigment based inks can be prepared which have excellent light fastness and water resistance. Thus, for purposes of obtaining a printed document with a reasonable degree of permanency, pigment based inks are preferred over dye based inks.

These major concerns dominate ink jet technology: (1) reliability, (2) drying rate, and (3) print quality. Typically, reliability is evaluated with respect to the following four criteria. The first is robustness with respect to continuous printing conditions such that the ink droplet weight does not change over time and good directionality is maintained. Good directionality means that the angular deviation of an ejected ink droplet from a nozzle is within about ±0.5° from the normal to the plane of the nozzle. The second is robustness with respect to intermittent printing conditions such that the nozzles do not clog over the time interval in which printing is discontinued. The third is robustness with respect to long term storage of the ink within the print head such that printing behavior unchanged from the original printing behavior (ink droplet) weight and good directionality) can be restored after applying a limited amount of suction to the nozzles. The fourth is chemical and physical stability of the ink towards storage at two temperature extremes and towards cycling between those two temperature extremes for an extended period of time.

The drying rate of the ink is an important factor in determining the throughput rate of the printer. In a sheet fed printer, the ink on a printed sheet must be dry before the succeeding sheet contacts it. If the ink is not dry, smearing will occur.

Print quality is typically defined in terms of two general factors: (1) color properties and (2) non-color image characteristics. Color properties of the ink are measured by optical density and the color coordinates which determine the hue. Non-color characteristics which determine the definition of an image are resolution (drops per unit area), the area coverage per drop, edge acuity or sharpness, and the extent of peripheral defects such as satellites (stray droplets around the perimeter of a printed character) or feathering.

A great concern with ink jet printing is the level of print quality, as defined by edge acuity or sharpness of an image and minimal feathering, which can be obtained on "plain paper." The term "plain paper" refers to a broad set of commercial papers, especially those available for use in electrographic copying. Such commercial papers do not rely on a unique structure, composition, or narrow set of properties such that only an ink jet printer can make best use of the paper's properties. In recent years there has been an increasing demand for ink jet printers which provide excellent print quality on plain paper.

In terms of print quality on plain paper, suitably designed pigment based inks are preferred over both conventional pigment based inks and dye based inks. When a liquid ink droplet contacts the paper surface as a result of ink jet printing, the liquid spreads out from the impact origin and penetrates the paper. Cellulose fibers, present in most plain papers, tend to act as wicks which draw the liquid along the length of the individual fibers by capillary action.

In dye based inks, in which the colorant is homogeneously dissolved in the liquid, the colorant will spread out, penetrate, and be drawn along the length of cellulose fibers to the exact same degree as the liquid. The typical result for a dye based ink is a colored dot which has poorly defined feathered edges.

In pigment based inks, in which the colorant is homogeneously dispersed in the liquid, unless the dispersion stability of the colorant is disrupted upon contact with the paper, the colorant will spread out, penetrate, and be drawn along the length of cellulose fibers to the nearly the same degree as the liquid. The typical result for a conventional pigment based ink is a colored dot which has poorly defined feathered edges. In contrast, a suitably designed pigment based ink, in which the dispersion stability of the colorant is disrupted upon contact with the paper, the colorant will not spread out, penetrate, and be drawn along the length of cellulose fibers in the same way as the liquid. For this type of ink, the colorant effectively separates from the liquid carrier. The result is a colored dot which has a sharp edge boundary with negligible feathering.

Water-based pigment dispersions are well known in the art, and have been used commercially for applying films, such as paints, to various substrates. A stable pigment dispersion is obtained by using a pigment dispersant which provides stability through either steric stabilization only or a combination of both steric stabilization and ionic stabilization.

Examples of polymer dispersants which provide only steric stabilization belong to the group of non-ionic water soluble polymers: polyvinyl alcohol, cellulosics, ethylene oxide modified phenols, and ethylene oxide/propylene oxide polymers. Pigment dispersions which incorporate such polymers do not lose their dispersion stability upon contact with paper, and thus, yield printed images with poorly defined feathered edges.

Examples of polymer dispersants which provide only steric stabilization belong to the group on non-ionic water soluble polymers: polyvinyl alcohol, cellulosics, ethylene oxide modified phenols, and ethylene oxide/propylene oxide polymers. Pigment dispersions which incorporate such polymers do not lose their dispersion stability upon contact with paper, and thus, yield printed images with poorly defined feathered edges.

Examples of polymer dispersants which provide both steric and ionic stabilization are those constructed from monomers of neutralized acrylic, maleic, or vinyl sulfonic acid. Pigment dispersions, which incorporate suitably designed polymer dispersants of this type, can be made to lose their dispersion stability upon contact with paper and yield printed images with sharp edges boundaries and negligible feathering. The means by which polymer dispersants of this type lose their dispersion stability upon contact with paper is described below.

Because polymers of this type contain multiple neutralized acid functionalities, they can be classified as anionic polyelectrolytes. Typically, anionic polyelectrolytes bind to multivalent cations such as magnesium, calcium, and aluminum. The strength and sensitivity of the multivalent cation binding depend on the linear charge density and the structure of the polyelectrolyte. For suitably designed pigment dispersions containing polymers, which have multiple neutralized acid functionalities, the polymers will bind to multivalent cations which are present on the surface of typical plain papers. If the degree of multivalent cation binding is sufficient, the anionic charge density of the dispersant will be partially or completely neutralized. Charge neutralization results in the loss of ionic stabilization with the concomitant result that the dispersion stability of the colorant is disrupted. As noted above, such disruption of the dispersion stability of the colorant will result in the colorant separating from the liquid carrier. The net result is a printed image which has sharp edge boundaries with negligible feathering.

The strength and sensitivity of polyelectrolyte multivalent cation binding depend on both the linear charge density and structure of the polyelectrolyte. In general, the higher the linear charge density of the polyelectrolyte, the greater the binding interaction between the polyelectrolyte and multivalent cations. Linear charge density is higher for polymers, in which the neutralized acid functionalities are on adjacent monomer units, than for polymers, in which the neutralized acid functionalities are on monomer units which are interspersed with nonionic monomer units. As an example, polyacrylic acid has a higher linear charge density than a random polymer of acrylic acid and styrene. The structure of the polyelectrolyte also can influence the strength and sensitivity of multivalent cation binding. If the binding sites on the polyelectrolyte have shapes and coordination environments which optimally match the ionic radii of multivalent cations, the binding interaction between that polyelectrolyte and multivalent cations will be greater that that of a similar polyelectrolyte with no special structural features. Obviously, a binding site which is optimal for $Ca^{2+}$ (ionic radius: 1.14 Å; six-coordinate) will not necessarily be optimal for $Mg^{2+}$ (ionic radius: 0.86 Å; six-coordinate). It also follows that a binding site which is optimal for $Ca^{2+}$ (ionic radius: 1.14 Å, six coordinate) may also bind reasonably well to monovalent $Na^+$ (ionic radius: 1.16 Å; six-coordinate).

It must be noted, however, that polymer dispersants which are constructed from only monomers of neutralized acrylic, maleic, or vinyl sulfonic acids, which are hydrophilic, do not yield stable pigment dispersions. This is because hydrophilic functionalities do not adhere sufficiently to the surface of conventional pigments. Stable pigment dispersions can be obtained only if the polymer dispersant also contain one or more hydrophobic segments which adsorb onto and adhere to the surface of the pigments. Thus, polymer dispersants, which provide both steric and ionic stabilization, must contain both hydrophobic segments and hydrophilic segments.

In U.S. Pat. No. 4,597,794, an aqueous ink dispersion for ink jet printers is described in which the pigment is dispersed using a random copolymer having hydrophilic neutralized carboxylic acid substituents and hydrophobic aromatic ring substituents that adhere to the pigment surface. Because the polymer is a random copolymer, the linear charge density is low and sensitivity towards multivalent cations on the surface of typical plain papers is expected to be low.

In U.S. Pat. No. 5,085,698, an aqueous ink dispersion for ink jet printers is described in which the pigment is dispersed using an AB or BAB block copolymer. The A segment of the block copolymer is a hydrophobic, water insoluble homopolymer or copolymer of an acrylic acid ester or an acrylic acid amide. The B segment of the block copolymer is a hydrophilic water soluble homopolymer or copolymer of an acrylic acid, an acrylic acid amide, or an acrylic acid ester in which the alcohol portion of the ester contains hydrophilic functionalities. For block polymers with B segments which contain acrylic acid functionalities, the acid functionalities are neutralized with neutralizing agents selected from the group consisting of organic bases, alkanolamines, alkali metal hydroxides, and mixtures thereof. The specific examples and comparative examples given in this patent show that inks formulated with AB or BAB block copolymer pigment dispersants, having discrete hydrophobic and hydrophilic segments, have better printhead performance than inks formulated with random copolymers of hydrophobic and hydrophilic monomers. Furthermore, because block copolymers have a high linear charge density on the hydrophilic B segment, better sensitivity than the above described random copolymers is expected towards multivalent cations on the surface of typical plain papers. Although the hydrophilic B segments have a high linear charge density, they do not have any special structural features which favor binding to multivalent cations.

As can be seen from the above examples, there remains a need for improved pigment dispersed aqueous ink compositions in which the pigment is stabilized by polymer dispersants which contain both hydrophobic and hydrophilic segments. Improved pigment dispersed aqueous ink compositions which give reliable printing performance and yield printed images which have excellent print quality are desired to meet the demanding needs of commercial ink jet printers.

SUMMARY OF THE INVENTION

It is an object of the present invention to provide a pigment dispersed aqueous ink composition for use in ink jet printing which gives reliable printing performance and yields printed images which have excellent print quality. The ink compositions are suitable for printing on plain paper.

According to the present invention, there is provided a pigment dispersed aqueous ink composition for use in ink jet printing which comprises water as the principal solvent, a pigment, and a pigment dispersant wherein the dispersant is a derivative of a polyuronic acid in which a hydrophobic polymer is covalently attached to the reducing terminus of the polyuronic acid.

It is another object of the present invention to provide a novel polyuronic acid derivative and a novel dispersant comprising the polyuronic acid derivative.

According to the present invention, there is provided a polyuronic acid derivative which comprises a polyuronic acid and a hydrophobic polymer covalently attached to the reducing terminus of the polyuronic acid. Furthermore, there is provided a dispersant comprising the polyuronic acid derivative.

DETAILED DESCRIPTION OF THE INVENTION

Ink Composition

The ink composition of the present invention is suitable for use in an ink jet printer using any of the methods known in the art for ejecting ink through a plurality of nozzles contained on a print head. The ink composition for the present invention can also be used in a writing instrument such as a pen, in which the conditions for use of the ink are less stringent than those of an ink printer.

Polyuronic Acid Derivatives

The polyuronic acid derivatives in the ink composition of the present invention have two parts: a polyuronic acid segment and a hydrophobic polymer segment covalently attached to the reducing terminus of the polyuronic acid.

The polyuronic acid derivative functions as a dispersant for dispersing pigments in the ink composition of the present invention. The pigment dispersed aqueous ink composition gives good printing performance and produces printed images of excellent quality. Without intending to be bound by theory, it is believed that the polyuronic acid derivative described herein is a two-part type dispersant containing a hydrophobic segment and a hydrophilic segment, but functions better than conventional two-part type dispersants. It yields stable dispersed pigments from which printed dots, which are free from feathering, are realized. The hydrophobic segment of the polyuronic acid derivative adheres to the surface of the pigment such that the pigment is dispersed effectively in the ink composition. Furthermore, the polyuronic acid segment of the polyuronic acid segment has a buckled shape containing pockets lined with carboxy groups and hydroxy groups. Structural studies of polyuronic acids indicate that the pockets are just the right size for binding to dipositive calcium ions. When the polyuronic acid segment of the polyuronic acid derivative binds to multivalent cations on the surface of plain paper, the stability of the pigment dispersion is disrupted. This prevents the pigment colorant from spreading out on the paper such that printed dots, which are free from feathering, are realized.

According to the present invention, polyuronic acid derivatives are provided as novell compounds. In another aspect of the present invention, novel dispersants comprising the polyuronic acid derivatives are also provided.

The amount of the polyuronic acid derivative in the ink composition of the present invention is about 0.1% to 30% by weight and more preferably 0.1 to 20% by weight.

Polyuronic Acid Segment

The polyuronic acid is composed primarily of 1,4-linked polygalacturonic acid, polyguluronic acid, polyiduronic acid, or mixed polymers thereof. The polyuronic acids are available from natural materials and may also contain non-uronic acid saccharides. The uronic acid content of the polyuronic acids used in this invention is greater than 80 wt. %. Even more preferably the uronic acid content is greater than 90 wt. %.

Polygalacturonic acid is obtained by hydrolysis and desesterification of pectin, a naturally occurring hydrocolloid which is obtained from fruits such as lemons, limes, grapefruits, oranges, mangoes, apples, sunflowers, and sugar beets. Polyguluronic acid is obtained by partial acid hydrolysis of alginic acid, a naturally occurring polysaccharide obtained from seaweeds such as giant kelp (*Macrocystis pyrifera*), horsetail kelp (*Laminaria digitata*), and sugar kelp (*Laminaria saccharina*), followed by selective precipitation. Polyiduronic acid is obtained by hydrolysis of various animal polysaccharides.

The number average molecular weight of the polyuronic acid used in the present invention is greater than or equal to about 700 and less than or equal to 10,000. More preferably the number average molecular weight of the polyuronic acid is greater than or equal to about 700 and less than or equal to about 7000.

Hydrophobic Polymer Segment

In one embodiment of the present invention, the hydrophobic polymer segment is a homopolymer or copolymer prepared from at least one monomer selected from the group consisting of styrene or substituted styrenes, vinyl pyridine or substituted vinyl pyridines, methacrylic acid esters, acrylic acid esters, acrylonitrile, methacrylonitrile, butadiene, and isoprene. Representative monomers that may be selected include, but are not limited to, the following: styrene, α-methyl styrene, 3-methyl styrene, 4-methyl styrene, 4-tert-butyl styrene, 3-nitrostyrene, 3-fluorostyrene, 4-fluorostyrene, 2-vinyl pyridine, 4-vinyl pyridine, methyl methacrylate, ethyl methacrylate, propyl methacrylate, n-butyl methacrylate, tert-butyl methacrylate, hexyl methacrylate, 2-ethyl-hexyl methacrylate, octyl methacrylate, lauryl methacrylate, stearyl methacrylate, phenyl methacrylate, glycidyl methacrylate, p-tolyl methacrylate, methyl acrylate, ethyl acrylate, propyl acrylate, n-butyl acrylate, tert-butyl acrylate, hexyl acrylate, 2-ethyl-hexyl acrylate, octyl acrylate, lauryl acrylate, stearyl acrylate, phenyl acrylate, 2-ethoxyethyl acrylate, 2-trimethylsiloxyethyl acrylate, glycidyl acrylate, p-tolyl acrylate, acrylonitrile, methacrylonitrile, butadiene, and isoprene.

The hydrophobic polymer, incorporating at least one of the monomers listed above, may be prepared using conventional anionic polymerization techniques. Because anionic polymerization uses "living" polymeric carbonions, stringent conditions with respect to oxygen, moisture, and other impurities must be maintained during the polymerization reaction. Accordingly, solvents and monomers must be rigorously purified before polymerization.

Hydrophobic polymers prepared using conventional anionic polymerization techniques have very narrow molecular weight distributions. The typical polymer has a dispersity less than 1.5 and generally in the range of 1.0 to 1.3. Dispersity is the polymer weight average molecular weight divided by the number average molecular weight. Both the polymer weight average molecular weight and the number average molecular weight can be obtained from size exclusion chromatography, using columns calibrated with polymer standards of known molecular weights.

As is well known in the art for anionic polymerization, a number of electrophiles will react with "living" polymeric carbanions resulting in functional group terminated polymers. For the purpose of covalently attaching the hydrophobic polymer segment to the reducing terminus of the polyuronic acid, such functional group terminated polymers are desirable. Carboxy terminated, hydroxy terminated and amino terminated polymers can be readily prepared by conventional techniques.

In a second embodiment of the present invention, the hydrophobic polymer segment may be a hydrophobic polymer composed primarily of poly(alkylsiloxane), preferably poly(dimethylsiloxane).

In a third embodiment of the present invention, the hydrophobic polymer segment is a polyamide. Specifically, the polyamide hydrophobic polymer segment is an N-acylated derivative of a polyamine, with the polyamine being one in which greater than 50% of the amine functionalities are either primary or secondary amines.

The polyamine, from which the polyamide is derived, is selected from the group of polyamines consisting of linear polyethylenimines, branched polyethylenimines, polyallylamine, poly-N-alkylallylamines, and polyvinylamine.

The acyl groups, R—(CO)—, of the polyamine comprise at least one selected from the following acyl groups: $C_{17}H_{(2n-1)}$—(CO)—, in which n is greater than or equal to 3, preferably 3 to 19; phenyl-(CO)—; substituted phenyl-(CO)—; phenyl-$CH_2$—(CO)—; substituted phenyl-$C_2H_4$—(CO)—. Polyamines N-acylated with the acyl groups $CH_3$—(CO)— and $C_2H_5$—(CO)— are not hydrophobic and will dissolve in water. Polyamines N-acylated with acyl groups $C_{11}H_{(2n-1)}$—(CO)—, in which n is greater than or equal to 3, are hydrophobic. Similarly, polyamines N-acylated with acyl groups which contain an aryl group are hydrophobic.

In a fourth embodiment of the present invention, the hydrophobic polymer segment is a hydrophobic polyamine. Specifically, the hydrophobic polyamine polymer segment is a poly-N-alkylated derivative of a water soluble polyamine. The water soluble polyamine, from which the hydrophobic poly-N-alkylated polyamine is derived, is selected from the group of water soluble polyamines consisting of polyethylenimines, polyallylamines, polyvinylamines, poly (propylene imine) dendrimers, and poly(amidoamine) dendrimers.

The alkyl groups of the poly-N-alkylated derivative of the water soluble polyamine have the following general form: —$CHS_1X_2$. The group $X_1$ may be H, an alkyl, a substituted alkyl, an aryl, or a substituted aryl group. The group $X_2$ also may be H, an alkyl, a substituted alkyl, an aryl, or a substituted aryl group. The selection of $X_1$ and $X_2$ will depend on the selection of water soluble polyamine which is covalently attached to the reducing terminus of the polyuronic acid. For example, in the case of the low molecular weight branched polyethylenimine, tris(2-aminoethyl) amine, which has the chemical formula $(H_2NCH_2CH_2)_3N$, the selection of $X_1$ and $X_2$ are dictated by the specification of the present invention, in which the molecular weight of the hydrophonic polymer is greater than or equal to 300. For fully alkylated tris(2-aminoethyl)amine, when $X_1$ and $X_2$ are the same, the number of carbon atoms of $X_1$ and $X_2$ must be greater than or equal to 3 to yield a molecular weight of the hydrophobic polymer greater than 300. Similarly, for partially alkylated tris(2-aminoethyl)amine, when $X_1$ is H and $X_2$ is an alkyl or substituted alkyl, the number of carbon atoms of $X_2$ must be greater than or equal to 4 to yield a molecular weight of the hydrophobic polymer greater than 300. For higher molecular weight water soluble polyamines, having molecular weights greater than or equal to 300, there is no restriction on the number of carbon atoms in the selection of $X_1$ and $X_2$. In addition to the selection of the water soluble polyamine, the selection of $X_1$ and $X_2$ will depend on the molecular weight of the polyuronic acid. The greater the hydrophobicity of the hydrophobic polyamine, the greater the molecular weight of the polyuronic acid must be in order to yield a water soluble polyuronic acid derivative.

The degree of N-alkylation of the covalently attached water soluble polyamine is greater than 10% of the total amine functionalities on the water soluble polyamine. More preferably the degree of N-alkylation is greater than 20%. Still more preferably the degree of N-alkylation is greater than 30%.

The hydrophobic polymers of the present invention have a number of average molecular weight less than or equal to 15,000, and more preferably less than or equal to 10,000. The hydrophobic polymers of the present invention have a number average molecular weight greater than or equal to 300. The preferred range of number average molecular weight is from 500 to 5000.

Covalent Attachment to the Reducing Terminus of the Polyuronic Acid

As noted in U.S. Pat. No. 5,085,698 the advantages of AB or BAB block copolymer pigment dispersants, having discrete hydrophobic (A) and hydrophilic (B) segments, in comparison to random copolymers has been clearly demonstrated Single covalent attachment of one hydrophobic polymer to one terminus of the polyuronic acid would yield a polyuronic acid derivative which could be classified as an AB block copolymer according the classification scheme in U.S. Pat. No. 5,085,698. Double covalent attachment of two hydrophobic polymers of both termini of the polyuronic acid would yield a polyuronic acid derivative which could be classified similarly as a BAB block copolymer. Multiple covalent attachment of several hydrophobic polymers to multiple functional groups on the polyuronic acid would yield a polyuronic acid derivative which could not be classified within the classification scheme of that patent. As will be described below, single covalent attachment of one hydrophobic polymer to one terminus of the polyuronic acid is the method of choice for preparing the pigment dispersants of the present invention.

The polyuronic acids described above have several functional groups to which hydrophobic polymers can be chemically attached: hydroxy groups (two per uronic acid except for the non-reducing terminus of the polyuronic acid which has three), carboxy groups (one per uronic acid), and a single terminal aldehyde group on the reducing terminus of the polyuronic acid. Covalent attachment of hydrophobic polymers to either hydroxyl groups or carboxy groups is expected to have a deleterious effect on the binding of multivalent cations by the polyuronic acid. In support of this statement, Schweiger has shown that partial acetylation of the hydroxyl groups of polyuronic acids results in diminished capacity to form a gel with calcium ions (J. Org. Chem., Vol.: 27, Page: 1789, Year: 1962; Vol.: 29, Page: 2973, Year: 1964). Because the carboxy groups are essential for the binding of multivalent cations, it goes without saying, that covalent attachment of hydrophobic polymers to the carboxy groups will diminish the binding interaction. In support of this statement, Kohn and Furda have shown that increasing the degree of esterification of the carboxy groups of polygalacturonic acid results in decreasing stability constants for the calcium polygalacturonates (Coll. Czech. Chem. Commun., Vol.: 32, Page: 4470, Year: 1967).

As there is only one unique functional group per polyuronic acid molecule, the terminal aldehyde group, single covalent attachment of one hydrophobic polymer to the terminal aldehyde or a derivative of the terminal aldehyde is the method of choice for preparing the pigment dispersants of the present invention. Because the aldehyde group is present on the reducing terminus of the polyuronic acid, covalent attachment of a hydrophobic polymer is not expected to disrupt the binding interaction between the polyuronic acid segment and multivalent cations present on the surface of plain paper.

Although many synthetic approaches are available for covalent attachment of hydrophobic polymers to the terminal aldehyde of the polyuronic acid or derivatives thereof, the preferred method of the present invention is reductive amination using an amino terminated hydrophobic polymer and unmodified polyuronic acid. As is well known for polysaccharides, such as polyuronic acid, the aldehyde group on the reducing terminus exists in solution predominantly as a cycle hemiacetal. Specifically, for polyuronic acids, the reducing terminus exists as a six-membered cyclic hemiacetal called a pyranose. Reductive amination using either primary or secondary amines results in opening, and thus disruption, of the pyranose ring structure. Disruption of one polyuronic acid unit at the terminal position is not expected to have a deleterious effect on the binding interaction between the polyuronic acid segment and multivalent cations.

Reductive amination using a primary amine terminated hydrophobic polymer yields a secondary amine. Similarly, reductive amination using a secondary amine terminated hydrophobic polymer results in a tertiary amine. Both potential amine products are chemically robust and stable with respect to hydrolysis. Thus, inks containing pigment dispersants prepared by reductive amination are expected to be chemically stable.

Reductive amination is conveniently carried out using borohydride or cyanoborohydride salts in aqueous or alcoholic aqueous solutions. Typically used borohydride salts include sodium borohydride, potassium borohydride, lithium borohydride, tetramethylammonium borohydride, and tetrabutylammonium borohydride. Typically used cyanoborohydride salts include sodium cyanoborohydride, potassium cyanoborohydride, lithium cyanoborohydride, and tetrabutylammonium cyanoborohydride. Borohydride salts must be used at pH values greater than about 7. Cyanoborohydride salts can be used at pH values as low as about 3. Borohydride or cyanoborohydride salts are very selective and will not reduce any of the carboxy groups which are present on the polyuronic acid. Less selective reagents for reductive amination which may be used include hydrogen with a catalyst, zinc and hydrochloric acid, iron pentacarbonyl and alcoholic potassium hydroxide, and formic acid.

The polyuronic acid derivative of the third embodiment of the present invention may be prepared by first providing a hydrophobic polyamide and then covalently attaching this polyamide to the reducing terminus of the polyuronic acid. However, according to the preferred embodiment of the present invention, the polyamide hydrophobic polymer segment may be prepared by first covalently attaching a polyamine, though one of its amine functionalities, to the reducing terminus of the polyuronic acid. This covalent attachment is readily accomplished by reductive amination, as described above. In the second step, the multiple amine functionalities of the covalently attached polyamine segment are selectively N-acylated using acylating reagents such as organic acid halides or organic acid anhydrides. Primary amines N-acylated in this manner yield primary amides. Similarly, secondary amines N-acylated in this manner yield secondary amides. Tertiary amines are not acylated.

Non-selective acylation of a polyuronic acid with a covalently attached polyamine segment, in which both 1) amine functionalities on the polyamine segment are converted to amides (N-acylation) and 2) hydroxyl groups on the polyuronic acid segment are converted to esters (O-acylation), must be avoided. As noted previously, partial acetyl acylation of the hydroxyl groups of polyuronic acids, results in diminished capacity to form gels with calcium ions. It follows that a polyuronic acid with a covalently attached polyamine segment, which is non-selectively acylated, will not have a high affinity for multivalent cation binding. As a consequence, pigment dispersed aqueous ink compositions, containing such non-selectively acylated dispersants, would not be expected to yield printed images having excellent print quality.

Published methods exist in the scientific literature for the selective N-acylation of amine functionalities in the presence of hydroxyl groups. In work published by Katsutoshi Inoue et al. (Adv. Chitin Science, Vol.: 1, Page: 271, Year: 1996), chitosan, a natural polymer derived from crustacean shells which contains one primary amine and two hydroxyl groups per monomer unit, is selectively N-acylated using diethylenetriaminepentaacetic acid anhydride in pyridine (65° C.; 24 hours). This reaction is a general one in which other organic acid anhydrides can be substituted for diethylenetriaminepentaacetic acid anhydride). In work published by Gunda I. Georg et al. (Bioorganic and Medicinal Chemistry Letters, Vol: 4, No. 2; Page: 355, Year: 1994), N-debenzoyltaxol, a complex diterpene which contains one primary amine and three hydroxyl groups, is selectively N-acylated with various organic acid chlorides under Schotten-Baumann conditions using sodium bicarbonate as a pH buffer. Both of these two approaches can be used to selectively N-acylate a polyuronic acid with a covalently attached polyamine segment.

Commercially available and useful acylating reagents of the organic acid halide type include the following: butyryl chloride, isobutyryl chloride, valeryl chloride, isovaleryl chloride, trimethylacetyl chloride, hexanoyl chloride, tert-butylacetyl chloride, heptanoyl chloride, octanoyl chloride, 2-ethylhexanoyl chloride, nonanoyl chloride, decanoyl chloride, undecanoyl chloride, lauroyl chloride, myristoyl chloride, palmitoyl chloride, stearoyl chloride, benzoyl chloride, phenylacetyl chloride, o-toluoyl chloride, m-toluoyl chloride, p-toluoyl chloride, 4-ethylbenzoyl chloride, hydrocinnamoyl chloride, 4-propylbenzoyl chloride, 4-butylbenzoyl chloride, 4-tert-butylbenzoyl chloride, 4-petnylbenzoyl chloride, 4-hexylbenzoyl chloride, 4-heptylbenzoyl chloride. Commercially available and useful acylating reagents of the organic acid anhydride type include the following: butyric anhydride, isobutyric anhydride, valeric anhydride, trimethylacetic anhydride, hexanoic anhydride, heptanoic anhydride, decanoic anhydride, benzoic anhydride.

Polyamines used in the third embodiment of the present invention can be obtained as follows. Linear polyethylenimines can be prepared by hydrolysis of poly(N-acyl) alkylenimines as described in a paper by Takeo Saegusa et al. (Macrocmolecules, Vol: 5, Page: 4470, Year: 1972). Branched polyethylenimines, in a variety of molecular weights, are commercially available from BASF and Nihon Shokubai. Polyallylamine and poly(N-alkyl)allyamines, in a variety of molecular weights, are commercially available from Nitto Boseki. Polyvinylamine, in a variety of molecular weights, is commercially available from Mitsubishi Kasei.

The polyuronic acid derivative of the fourth embodiment of the present invention may be prepared by first providing a hydrophobic polyamine and then covalently attaching this polyamine to the reducing terminus of the polyuronic acid. However, according to the preferred embodiment of the present invention, the hydrophobic polyamine polymer segment may be prepared by first covalently attaching a water soluble polyamine, through one of its amine functionalities, to the reducing terminus of the polyuronic acid. This covalent attachment is readily accomplished by reductive amination, as described above. In the second step, the multiple amine functionalities of the covalently attached polyamine segment are selectively N-alkylated by reductive amination using aldehydes and/or ketones as the source of the alkyl groups. As described above, reductive amination is conveniently carried out using borohydride or cyanoborohydride salts. In the case in which an excess of an aldehyde is used, reductive amination of primary amine and secondary amine functionalities on the covalently attached water soluble polyamine segment will yield tertiary amine functionalities. In the case in which an excess of a ketone is used, reductive amination of primary amine and secondary amine functionalities on the covalently attached water soluble polyamine segment will yield secondary amine functionalities and tertiary amine functionalities, respectively.

Water soluble polyamines used in the fourth embodiment of the present invention can be obtained as follows. Branched polyethylenimines, in a variety of molecular weights, are commercially available from BASF and Nihon Shokubai. Polyallylamines are commercially available from Nitto Boseki and polyvinylamines are commercially available from Mitsubishi Kasei. Poly(propylene imine) dendrimers are commercially available from DSM Fine Chemicals. Poly(amidoamine)dendrimers may be purchased under the trade name of Starburst™ dendrimers from the Aldrich Chemical Company, Inc.

In the third and fourth embodiments of the present invention, the hydrophobic segment is prepared in a two-step process, in which a polyamine is covalently attached in the first step, through one of its amine functionalities, to the reducing terminus of the polyuronic acid. This covalent attachment is readily accomplished by reductive amination, as described above. In order to effect the covalent attachment of one polyuronic acid per one polyamine and not the covalent attachment of multiple polyuronic acids per one polyamine, it is necessary to use an excess of polyamine, with respect to the polyuronic acid, in the reductive amination. A stoichiometric ratio of polyamine to polyuronic acid in the reductive amination reaction of greater than about 2:1 is preferred. For most linear and branched polyamines, there will be several chemically distinct amine functionalities through which covalent attachment to the polyuronic acid can occur. Although some control, as to which amine functionalities will be selectively attached to the polyuronic acid, can be achieved by varying the pH of the reductive amination reaction, in general, a mixture of compounds, differing with regard to the chemical identity of the attached amine, will be obtained. For dendrimer polyamines, having a single chemically distinct amine functionality, covalent attachment of the polyamine through one of its amine functionalities will yield a single compound, if the polydispersity of the polyuronic acid is ignored.

Synthetic approaches other than reductive amination, which result in single covalent attachment of one hydrophobic polymer to the reducing terminus of the polyuronic acid, are also within the scope of the present invention.

For example, a hydrophobic polymer, functionalized with a terminal aryl hydrazine group, is expected to react selectively with the terminal aldehyde in aqueous or alcoholic aqueous solutions to yield a phenylhydrazone derivative. Another approach, which has been used for the synthesis and screening of glycoconjugates, should be applicable to polyuronic acids. In the first step of this approach, the reducing terminus hemiacetal is converted to a glycosylamine derivative by stirring a solution of the polysaccharide in saturated aqueous ammonium carbonate for several days. This reaction has been successfully demonstrated for charged polysaccharides. In the second step, the glycosylamine derivative is selectively amidated using a large excess of the homobifunctional reagent, disuccinimidyl suberate (DSS). As a result of this derivatization, one N-hydroxysuccinimidyl ester is left intact, allowing for further derivatization. In the third step, the DSS modified glycosylamine derivative is selectively amidated using an amine functionalized hydrophobic polymer. The net result is single covalent attachment of one hydrophobic polymer to the reducing terminus of the polysaccharide by means of an eight carbon spacer group.

Pigment

The pigment of the present invention comprises at least one selected from the group consisting organic or inorganic pigments. The term "pigment" as used herein means an insoluble colorant.

The pigment particles are sufficiently small to permit free flow of the pigment dispersed ink through the ink jet printing device, especially through the ejecting nozzles which typically have a diameter ranging from 10 to 50 microns. The particle diameter of the pigment is preferably 10 microns or less and more preferably 1.0 micron or less.

The selected pigment may be used in dry or wet form. Usually pigments are manufactured in aqueous media and the resulting pigment is obtained as a water wet presscake. In this presscale form, the pigment is not agglomerated to the extent that it is in a dry form. Pigments in wet presscake form do not require as much deflocculation in the process of preparing inks as do dry pigments.

Pigments of the present invention may include the following: Symuler Fast Yellow GF (Dainippon Ink; C.I. Pigment Yellow 12), Symuler Fast Yellow GRF (Dainippon Ink; C.I. Pigment Yellow 13), Symuler Fast Yellow 5GF (Dainippon Ink; C.I. Pigment Yellow 14), Irgalite Yellow CG (Ciba-Geigy; C.I. Pigment Yellow 16), Symuler Fast Yellow HGF (Dainippon Ink; C.I. Pigment Yellow 17), Symuler Fast Yellow 4117 (Dainippon Ink; C.I. Pigment Yellow 73), Symuler Fast Yellow 4191N (Dainippon Ink; C.I. Pigment Yellow 74), Symuler Fast Yellow 4181 (Dainippon Ink; C.I. Pigment Yellow 83), Chromophthal Yellow 3G (Ciba-Geigy; C.I. Pigment Yellow 93), Chromophthal Yellow GR (Ciba-Geigy; C.I. Pigment Yellow 95), Symuler Fast Yellow 4186 (Dainippon Ink; C.I. Pigment Yellow 97), Hansa Brillent Yellow 10GX (Hoechst Celanese; C.I. Pigment Yellow 98), Permanent Yellow G3R-01 (Hoechst Celanese; C.I. Pigment Yellow 114), Chromophthal Yellow 8G (Ciba-Geigy; C.I. Pigment Yellow 128), Irgazin Yellow 5GT (Ciga-Geigy; C.I. Pigment Yellow 129), Hostaperm Yellow H4G (Hoechst Celanese; C.I. Pigment Yellow 151), Symuler Fast Yellow 4192 (Dainippon Ink; C.I. Pigment Yellow 154), Hostaperm Orange GR (Hoechst Celanese; C.I. Pigment Orange 43), Paliogen Orange (BASF; C.I. Pigment Orange 51), Symuler Brilliant Carmine (Dainippon Ink; C.I. Pigment Red 57:1), Fastogen Super Magenta (Dainippon Ink; C.I. Pigment Red 122), Paliogen Red L3870 (BASF; C.I. Pigment Red 123), Hostaperm Scarlet GO (Hoechst Celanese; C.I. Pigment Red 168), Permanent Rubine F6B (Hoechst Celanese; C.I. Pigment Red 184), Monastral Magenta (Ciba-Geigy; C.I. Pigment Red 202), Monastral Scarlet (Ciba-Geigy; C.I. Pigment Red 207), Fastogen Blue GP-100 (Dainippon Ink; C.I. Pigment Blue 15:2), Fastogen Blue GNPR (Dainippon Ink; C.I. Pigment Blue 15:3), Fastogen Blue GNPS (Dainippon Ink; C.I. Pigment Blue 15:4), Micracet Blue R (Ciba-Geigy; C.I. Pigment Blue 60), Fastogen Green S (Dainippon Ink; C.I. Pigment Green 7), Fastogen Green 2YK (Dainippon Ink; C.I. Pigment Green 36) Fastogen Super Red (Dainippon Ink; C.I. Pigment Violet 19), Fastogen Super Violet (Dainippon Ink; C.I. Pigment Violet 23), Monastral Maroon RT-229-D (Ciba-Geigy; C.I. Pigment Violet 42), Raven 1170 (Columbian Chemicals; C.I. Pigment Black 7), Special Black 4A (Degussa; C.I. Pigment Black 7), FW 18 (Degussa; C.I. Pigment Black 7) and Colour Black S 160 (Degussa; C.I. Pigment Black 7).

The amount of pigment in the ink composition of the present invention is about 0.1% to 20% by weight and more preferably 0.1 to 10% by weight.

Water

Water is the principal solvent for the pigment dispersed aqueous ink compositions of the present invention. Additional components which may be included in the ink compositions are given below. The amount of the aqueous carrier medium in the ink composition of the present invention if 70 to 99.8% by weight.

Base

To solubilize the polyuronic acid segment of the pigment dispersant in the aqueous medium, it may be necessary to neutralize some or all of the carboxylic acid functions. Bases which are suitable for this purpose include organic bases, alkanolamines, alkali metal hydroxides, and mixtures thereof. Examples of suitable bases include the following: methylamine, dimethylamine, trimethylamine, morpholine, N-methylmorpholine, monoethanolamine, diethanolamine, triethanolamine, N-methyl-monoethanolamine, N,N-dimethyl-monoethanolamine, N-methyl-diethanolamine, tetramethylmethylammonium hydroxide, ammonia, lithium hydroxide, sodium hydroxide, potassium hydroxide, rubidium hydroxide, and cesium hydroxide.

Water Soluble Cosolvents

In addition to the above described components, the inks may contain, optionally, one or more water soluble organic solvents. Water soluble organic solvents are well known and include: (1) alcohols such as isopropyl alcohol, butyl alcohols, etc. (2) ketones such as acetone, methyl ethyl ketone, etc. (3) ethers such as tetrahydrofuran, dioxane, etc. (4) esters such as ethyl acetate, propylene carbonate, etc. (4) polyhydric alcohols such as ethylene glycol, propylene glycol, butylene glycol, diethylene glycol, triethylene glycol, polyethylene glycol, polypropylene glycol, 1,5-pentanediol, 1,2,6-hexanetriol, thiodiglycol, glycerol, etc. (6) lower alkyl ethers of polyhydric alcohols such as ethylene glycol monomethyl ether, ethylene glycol dimethyl ether, ethylene glycol monomethyl ether, ethylene glycol diethyl ether, ethylene glycol mono-n-propyl ether, ethylene glycol mono-isopropyl ether, ethylene glycol mono-n-butyl ether, ethylene glycol mono-sec-butyl ether, ethylene glycol mono-isobutyl ether, ethylene glycol mono-tert-butyl ether, ethylene glycol mono-n-amyl ether, ethylene glycol mono-n-hexyl ether, propylene glycol monomethyl ether, propylene glycoldimethyl ether, propylene glycol monoethyl ether, propylene glycol diethyl ether, propylene glycol mono-n-propyl ether, propylene glycol mono-isopropyl ether, propylene glycol mono-n-butyl ether, propylene glycol mono-sec-butyl ether, propylene glycol mono-isobutyl ether, propylene glycol mono-tert-butyl ether, diethylene glycol monomethyl ether, diethylene glycol dimethyl ether, diethylene glycol monoethyl ether, diethylene glycol mono-n-propyl ether, diethylene glycol mono-isopropyl ether, diethylene glycol mono-n-butyl ether, dipropylene glycol monomethyl ether, dipropylene glycol monoethyl ether, dipropylene glycol mono-n-propyl ether and dipropylene glycol mono-n-butyl ether, etc. (7) nitrogen containing compounds such as urea, pyrrolidone, N-methyl-2-pyrrolidone, etc. (8) sulfur containing compounds such as dimethylsulfoxide, tetramethylene sulfoxide, etc. No particular limitation is imposed on the total amount of cosolvent to be used in the ink. Preferably it is present in a range of 0.5 to 40 wt. %.

Other Components

In addition to the above described components, the inks may contain, optionally, one or more penetrability imparting surfactants selected from the group consisting of anionic or non-ionic surfactants. Examples of anionic surfactants include fatty acid salts, higher alcohol sulfuric ester salts, alkylbenzene sulfonates, and higher alcohol phosphoric ester salts. Examples of nonionic surfactants include ethylene oxide adducts of acetylenic diols, ethylene oxide adducts of higher alcohols, ethylene oxide adducts of alkylphenols, aliphatic ethylene oxide adducts, ethylene oxide adducts of higher alcohol fatty acid esters, ethylene oxide adducts of higher alkyl amines, ethylene oxide adducts of fatty acid amides, ethylene oxide adducts of polypropylene glycol, fatty acid esters of polyhydric alcohols, alkanolamine fatty acid amides and ethylene oxide-propylene oxide copolymers. Preferably used are ethylene oxide adducts of acetylenic diols which are available from Air Products and Chemicals, Inc.; Allentown, Pa. 18195; USA. Examples include Surfynol 465 (ethaoxylated tetramethyl decynediol), Surfynol CT-136 (acetylenic diol and anionic surfactant blend), Surfynol GA (acetylenic diol blend) and Surfynol TG (acetylenic diol blend in ethylene glycol). No particular limitation is imposed on the amount of penetrability-imparting surfactant to be used in the ink. Preferably it is present in a rang of 0.01 to 5 wt. %. In addition to the above penetrability-imparting surfactants, the inks may contain additives such as pH buffers, biocides, viscosity modifiers, ultraviolet ray absorbers, and antioxidants. The amounts of all components of the ink are selected such that the viscosity of the ink is less than 10 cps at 20° C.

Ink Preparation

The ink preparation of the present invention can be prepared in one step by dispersing and mixing the above described components using an acceptable method. Alternatively, the ink composition can be prepared in two steps by 1) dispersing and mixing some of the above described components and then 2) adding the remaining components to the dispersion and mixing. The dispersing step may be accomplished using a ball mill, a sand mill, an atrittor, a roll mill, an agitator mill, a Henschel mixer, a colloid mill, an ultrasonic homogenizer, a jet mill, an angmill, or any other type of milling device known to those skilled in the art such that a homogeneous dispersion is obtained.

It may be desirable to prepare first the pigmented ink in a concentrated form and then subsequently dilute the concentrated dispersion to a concentration appropriate for use in the ink jet printer. Also, it is generally desirable to filter the pigment dispersed aqueous ink composition, preferably using a metal mesh filter or a membrane filter. Filtration may be accomplished by applying pressure to the ink composition being filtered or by reducing the pressure on the receiving end of the filtration device. Centrifugal separation may also be used to remove large particles which may cause obstruction of the nozzles on the printhead of the ink jet printer.

EXAMPLES

The present invention will be further clarified by the following specific examples.

Preparation of Polygalacturonic acid

Polygalacturonic acid used in the below examples was prepared using the following general procedure. Pectin (for example BA-KING, The Copenhagen Pectin Factory Ltd.) is slurried at 10% by weight in a solution of isopropanol and water (60:40). Sodium hydroxide in the amount of half of the weight of the pectin is added to the slurry. The combined slurry is then stirred for 3 days at '° C. The solid is collected by filtration and washed extensively using a solution of isopropanol and water (60:40). Next, the solid is suspended in an excess of water. The pH of the suspension is adjusted to about 1.5 by slow addition of 1 M aqueous oxalic acid. After stirring the acidified suspension for 24 hours, the solid polygalacturonic acid is collected by filtration. The solid is washed extensively first with a solution of ethanol and water (60:40), then washed with ethanol, and then dried under vacuum. The dried polygalacturonic acid is then converted into its sodium salt by neutralization with dilute sodium hydroxide solution such that a 1 wt. % solution of the neutralized polygalacturonic acid is prepared. The pH of the resulting solution is adjusted to approximately 3.3 by dropwise addition of dilute sulfuric acid. Next, the solution is heated for 4 hours at 100° C., the pH being kept at 3.3 by periodic addition of small amounts of dilute sulfuric acid. The cooled solution is filtered and then concentrated to one third of the original volume using a rotary evaporator. Four volumes of ethanol are added and the precipitated material removed by filtration. The collected solid is dissolved in water to yield a 10 wt. % solution and then the pH of the solution is adjusted to 1.5 by slow addition of 1 M aqueous oxalic acid. After stirring the acidified suspension for 24 hours, the solid polygalacturonic acid is collected by filtration. The solid is washed extensively first with a solution of ethanol and water (60:40), then washed with ethanol, and then dried under vacuum.

Preparation of Polyguluronic Acid

Polyguluronic acid used in the below examples was prepared using the following general procedure. Alginic acid (for example 1–3G, Kimitsu Chemical Industries) is slurried at 5% by weight in a solution of one molar aqueous oxalic acid. The slurry is stirred vigorously for ten minutes resulting in a viscous suspension. The suspension is then heated to reflux on a boiling water bath. While passing a stream of nitrogen through the mixture, the mixture is refluxed for 20 hours. After cooling to room temperature, the mixture is centrifuged in 100 ml centrifuge tubes for one hour at 3000 rpm. The supernatant is discarded and the precipitate is suspended in deionized water in the amount of 60% of the weight of the original aqueous oxalic acid solution. A solution of 40 wt. % sodium hydroxide solution is added dropwise to the stirred mixture until the precipitate just dissolves. Solid oxalic acid dihydrate in the amount of one ninth of the total solution weight is added to the solution with stirring. The partially hydrolyzed alginic acid precipitates resulting in a viscous suspension. The suspension is heated to reflux on a boiling water bath. While passing a stream of nitrogen through the mixture, the mixture is refluxed for 20 hours. After cooling to room temperature, the mixture is centrifuged in 100 ml centrifuge tubes for one hour at 3000 rpm. The supernatant is discarded and the precipitate dried under vacuum until a constant weight is obtained. The dried solid is suspended in 0.1 molar aqueous sodium chloride such that a 0.5 wt. % solution of the partially hydrolyzed alginic acid is obtained. A solution of 10 wt. % sodium hydroxide solution is added dropwise to the stirred mixture until the pH of the solution rises to about a value of 6. While stirring vigorously, the mixture is centrifuged in 100 ml centrifuge tubes for one hour at 3000 rpm. The supernatant is discarded and the precipitated solid polyguluronic acid is suspended in 50 wt. % aqueous ethanol of the same weight as the original aqueous oxalic acid solution. After stirring the suspension for 24 hours, the solid polyguluronic acid is collected by filtration. The solid is washed extensively with ethanol, and then dried under vacuum.

Pigment dispersant A

1-[4-polystyrenecarboxylamido-butylamino] dihydropolygalacturonic acid 5.0 g of polygalacturonic acid and 3.3 g of N,N-diisopropylethylamine are dissolved in 100 ml. of 50 wt. % aqueous methanol solution with stirring 10.0 g of 4-polystyrylcarboxyamido-butylamine (Amino Terminated Polystyrene, $M_n$=2600, Polymer Source, Inc.) and 5.0 g of tetramethylammonium borohydride are added. The reaction flask is flushed with argon gas for three minutes and then sealed with a serum cap. The reaction mixture is stirred for 96 hours at room temperature. While cooling the mixture with stirring using an ice bath, concentrated HCl (10 ml) is added and, after stirring for 1 hour at room temperature, the mixture is evaporated to dryness. Next, the residue is triturated with several portions of absolute methanol, with the washings being discarded. The remaining solid is dried under vacuum to constant weight. The dried solid is suspended in deionized water to yield a mixture which is 40% by weight of the polyuronic acid derivative. The mixture is stirred vigorously. N,N-dimethylethanolamine is then added dropwise over a period of 2–3 hours with vigorous stirring until the pH of the mixture reaches an unchanging value of 8.0. A small amount of undissolved material is removed by filtration. Additional deionized water is added to give a solution which is approximately 25% by weight solid material.

Pigment dispersant B

1-[4-poly(2-vinylpyridine)carboxyamido-butylamino] dihydropolygalacturonic acid

The same method as used above for preparing Pigment Dispersant A is used except 4-poly(2-vinylpyridine) carboxyamido-butylamine (Amino Terminated Poly(2-vinylpyridine), $M_n$=1500, Polymer Source, Inc.) is substituted for 4-polystyrylcarboxyamido-butylamine.

Pigment Dispersant C

1-[4-polystyrenecarboxyamido-butylamino] dihydropolyguluronic acid

The same method as used above for preparing Pigment Dispersant A is used except polyguluronic acid is substituted for polygalacturonic acid.

Pigment Dispersant D

1-[4-poly(2-vinylpyridine)carboxyamido-butylamino] dihydropolyguluronic acid

The same method as used above for preparing Pigment Dispersant B is used except polyguluronic acid is substituted for polygalacturonic acid.

Pigment Dispersant E

[poly(N-4-ethylbenzoyl)alkylenemine]-dihydropolygalacturonic acid 10.0 g of polygalacturonic acid and 11.0 g of aqueous lithium hydroxide monohydrate (15 wt. %) are dissolved in 300 ml of deionized water with stirring. To this solution, is added 70 g of branched polyethylenimine (SP-003, manufactured by Nihon Shokubai; molecular weight 300) with stirring. The pH of the combined solution is adjusted to 10.1 by dropwise addition of 6 N hydrochloric acid solution with vigorous stirring. While flushing the flask with a brisk stream of argon gas, 1.0 g of lithium borohydride is added gradually with vigorous stirring. The reaction flask is sealed with a serum cap, which is vented to an oil bubbler, and the reaction mixture is stirred for 48 hours at room temperature. The temperature of the mixture is raised to 40° C. using a water bath and the mixture stirred for 2 hours to hydrolyze any residual lithium borohydride to lithium metaborate and hydrogen. Next, water is removed, using a rotary evaporator, to yield an oily solid. The solid is triturated with multiple portions of a solution of 5% N,N-dimethylethanolamine (by weight) in absolute methanol to remove excess polyethylenimine. The washings are discarded and the remaining solid is dried under vacuum to constant weight.

The dried solid and 0.5 g of aqueous lithium hydroxide monohydrate (15 wt. %) are added to 300 mL of deionized water with stirring. A slightly cloudy solution is obtained to which 18 g of lithium carbonate is added. Next, 20 g of 4-ethylbenzoyl chloride is added dropwise to the vigorously stirred mixture. The mixture is stirred continuously for an additional 4 hours after addition of the organic acid chloride. While cooling the stirred mixture using an ice bath, concentrated hydrochloric acid solution is added slowly; considerable foaming occurs as the excess lithium carbonate is neutralized. The addition of acid is continued until the pH of the mixture reaches a value of 1.5. This acidified mixture is evaporated to dryness using a rotary evaporator. Next, the residue is triturated with multiple portions of toluene to remove excess 4ethylbenzoic acid. The washings are discarded and the remaining solid is dried under vacuum to constant weight.

The dried solid is suspended in deionized water to yield a mixture which is 40% by weight of the polyuronic acid derivative. N,N-dimethylethanolamine is added dropwise over a period of 2–3 hours with vigorous stirring until the pH of the mixture reaches an unchanging value of 8.0. A small amount of undissolved material is removed by filtration. Additional deionized water is added to give a solution which is approximately 25% by weight solid material.

Pigment Dispersant F
[poly(N-octanoyl)alkylenimine]-dihydropolygalacturonic acid 10.0 g of polygalacturonic acid is reductively aminated with branched polyethylenimine (SP-003, manufactured by Nihon Shokubai; molecular weight: 300) by the same method as described above for preparing Pigment Dispersant E. The isolated solid is dried under vacuum to constant weight.

The dried solid and 0.5 g of aqueous lithium hydroxide monohydrate (15 wt. %) are added to 300 mL of deionized water with stirring. A slightly cloudy solution is obtained to which 18 g of lithium carbonate is added. Next, 19.5 g of octanoyl chloride is added dropwise to the vigorously stirred mixture. The mixture is stirred continuously for an additional 4 hours after addition of the organic acid chloride. While cooling the stirred mixture using an ice bath, concentrated hydrochloric acid solution is added slowly; considerable foaming occurs as the excess lithium carbonate is neutralized. The addition of acid is continued until the pH of the mixture reaches a value of 1.5. This acidified mixture is evaporated to dryness using a rotary evaporator. Next, the residue is triturated with multiple portions of dichloromethane to remove excess octanoic acid. The washings are discarded and the remaining solid is dried under vacuum to constant weight.

The dried solid is suspended in deionized water to yield a mixture which is 40% by weight of the polyuronic acid derivative. N,N-dimethylethanolamine is added dropwise over a period of 2–3 hours with vigorous stirring until the pH of the mixture reaches an unchanging value of 8.0. A small amount of undissolved material is removed by filtration. Additional deionized water is added to give a solution which is approximately 25% by weight solid material.

Pigment Dispersant G
[poly-(N-isobutyryl)allylamine]-dihydropolygalacturonic acid 10.0 g of polygalacturonic acid and 11.0 g of aqueous lithium hydroxide monohydrate (15 wt. %) are dissolved in 300 mL of deionized water with stirring. In a separate flask, 16 g of lithium hydroxide monohydrate is added gradually with stirring to 100 g of polyallylamine hydrochloride solution (Danfix-723, manufactured by Nitto Boseki; free amine molecular weight: 960; 35 wt. % solids). The flask is cooled in an ice bath during the addition and dissolution of the lithium hydroxide monohydrate. Next, the aqueous solution of polyallylamine and lithium chloride is added to the solution of neutralized polygalacturonic acid. The pH of the combined solution is adjusted to 10.2 by dropwise addition of 6 N hydrochloric acid solution with vigorous stirring. While flushing the flask with a brisk stream of argon gas, 1.0 g of lithium borohydride is added gradually with vigorous stirring. The reaction flask is sealed with a serum cap, which is vented to an oil bubbler, and the reaction mixture is stirred for 48 hours at room temperature. The temperature of the mixture is raised to 40° C. using a water bath and the mixture stirred for 2 hours to hydrolyze any residual lithium borohydride to lithium metaborate and hydrogen. Next, water is removed, using a rotary evaporator, to yield an oily solid. The solid is triturated with multiple portions of a solution of 5% triethylamine (by weight) in absolute methanol to remove excess polyallylamine. The washings are discarded and the remaining solid is dried under vacuum to constant weight.

The dried solid and 1.0 g of aqueous lithium hydroxide monohydrate (15 wt. %) are added to 300 mL of deionized water with stirring. A slightly cloudy solution is obtained to which 26 g of lithium carbonate is added. Next, 29 g of isobutyryl chloride is added dropwise to the vigorously stirred mixture. The mixture is stirred continuously for an additional 4 hours after addition of the organic acid chloride. While cooling the stirred mixture using an ice bath, concentrated hydrochloric acid solution is added slowly; considerable foaming occurs as the excess lithium carbonate is neutralized. The addition of acid is continued until the pH of the mixture reaches a value of 1.5. This acidified mixture is evaporated to dryness using a rotary evaporator. Next, the residue is triturated with multiple portions of dichloromethane to remove excess isobutyric acid. The washings are discarded and the remaining solid is dried under vacuum to constant weight.

The dried solid is suspended in deionized water to yield a mixture which is 40% by weight of the polyuronic acid derivative. N,N-dimethylethanolamine is added dropwise over a period of 2–3 hours with vigorous stirring until the pH of the mixture reaches an unchanging value of 8.0. A small amount of undissolved material is removed by filtration. Additional deionized water is added to give a solution which is approximately 25% by weight solid material.

Pigment Dispersant H
[hexa(N-4-tert-butylbenzoyl)pentaethylenehexamine] dihydropolyguluronic acid 10.0 g of polyguluronic acid and 11.0 g of aqueous lithium hydroxide monohydrate (15 wt. %) are dissolved in 300 mL of deionized water with stirring. To this solution, is added 60 g of pentaethylenehexamine (Aldrich Japan; Catalog number: 29,275-3) with stirring. The pH of the combined solution is adjusted to 10.1 by dropwise addition of 6 N hydrochloric acid solution with vigorous stirring. While flushing the flask with a brisk stream of argon gas, 1.0 g of lithium borohydride is added gradually with vigorous stirring. The reaction flask is sealed with a serum cap, which is vented to an oil bubbler, and the reaction mixture is stirred for 48 hours at room temperature. The temperature of the mixture is raised to 40° C. using a water bath and the mixture stirred for 2 hours to hydrolyze any residual lithium borohydride to lithium metaborate and hydrogen. Next, water is removed, using a rotary evaporator, to yield an oily solid. The solid is triturated with multiple portions of a solution of 5% N,N-dimethylethanolamine (by weight) in absolute methanol to remove excess pentaethylenehexamine. The washings are discarded and the remaining solid is dried under vacuum to constant weight.

The dried solid and 0.5 g of aqueous lithium hydroxide monohydrate (15 wt. %) are added to 300 mL of deionized water with stirring. A slightly cloudy solution is obtained to which 17 g of lithium carbonate is added. Next, 17.7 g of 4-tert-butylbenzoyl chloride is added dropwise to the vigorously stirred mixture. The mixture is stirred continuously for an additional 4 hours after addition of the organic acid chloride. While cooling the stirred mixture using an ice bath, concentrated hydrochloric acid solution is added slowly; considerable foaming occurs as the excess lithium carbonate is neutralized. The addition of acid is continued until the pH of the mixture reaches a value of 1.5. This acidified mixture is evaporated to dryness using a rotary evaporator. Next, the residue is triturated with multiple portions of toluene to remove excess 4-tert-butylbenzoic acid. The washings are discarded and the remaining solid is dried under vacuum to constant weight.

The dried solid is suspended in deionized water to yield a mixture which is 40% by weight of the polyuronic acid derivative. N,N-dimethylethanolamine is added dropwise over a period of 2–3 hours with vigorous stirring until the pH of the mixture reaches an unchanging value of 8.0. A small amount of undissolved material is removed by filtration. Additional deionized water is added to give a solution which is approximately 25% by weight solid material.

Pigment Dispersant I
[hexa(N-4-hydrocinnamoyl)pentaethylenehexamine] dihydropolyguluronic acid 10.0 g of polyguluronic acid is reductively aminated with pentaethylenehexamine (Aldrich Japan; Catalog number: 29,275-3) by the same method as described above for preparing Pigment Dispersant H. The isolated solid is dried under vacuum to constant weight.

The dried solid and 0.5 g of aqueous lithium hydroxide monohydrate (15 wt. %) are added to 300 mL of deionized water with stirring. A slightly cloudy solution is obtained to which 17 g of lithium carbonate is added. Next, 15.0 g of hydrocinnamoyl chloride is added dropwise to the vigorously stirred mixture. The mixture is stirred continuously for an additional 4 hours after addition of the organic acid chloride. While cooling the stirred mixture using an ice bath, concentrated hydrochloric acid solution is added slowly; considerable foaming occurs as the excess lithium carbonate is neutralized. The addition of acid is continued until the pH of the mixture reaches a value of 1.5. This acidified mixture is evaporated to dryness using a rotary evaporator. Next, the residue is triturated with multiple portions of toluene to remove excess hydrocinnamic acid. The washings are discarded and the remaining solid is dried under vacuum to constant weight.

The dried solid is suspended is deionized water to yield a mixture which is 40% by weight of the polyuronic acid derivative. N,N-dimethylethanolamine is added dropwise over a period of 2–3 hours with vigorous stirring until the pH of the mixture reaches an unchanging value of 8.0. A small amount of undissolved material is removed by filtration. Additional deionized water is added to give a solution which is approximately 25% by weight solid material.

Polyguluronic acid reductively aminated with polyethylenimine (MW-800)
[PGA-PEI$_{800}$]

100.0 g of polyguluronic acid and 35.0 g of polyethylenimine (Product Name: Lupasol FG; BASF; MW=800) were dissolved in 300 mL of deionized water contained in a one-liter beaker with stirring. An additional 165.0 g of the same polyethylenimine was added to the solution with stirring. Next, the pH of the combined solution was adjusted to 8.95 by dropwise addition of 12 N hydrochloric acid solution with vigorous stirring. After deionized water was added to bring the total volume of the solution up 900 mL, the solution was set aside to stand at room temperature for 10 days. After standing for 10 days, the solution was transferred to a two-liter beaker. While stirring the solution vigorously, 5.0 g of sodium borohydride was added to the solution in five 1.0 g portions over a period of 6 hours. The solution was set aside to stand overnight. The solution was again stirred vigorously, and 1.0 g of lithium borohydride was added in five 0.2 g portions over a period of 6 hours. The solution was again set aside to stand overnight. After transferring the solution to a 3 liter beaker, 330 g of sodium acetate trihydrate was added to the solution with stirring. After the sodium acetate trihydrate had dissolved, 1.5 liters of methanol were added with stirring. The addition of methanol resulted in precipitation of an off-white solid. The mixture was set aside to stand overnight. Next, the solid was isolated from the mixture by centrifuging in several batches (100 mL centrifuge tubes) at 3000 rpm for about 20 minutes. The solid was transferred to a 2 liter beaker and deionized water was added to bring the total volume of the mixture up 1300 mL. The mixture was stirred with warming to 50° C. for a period of 6 hours and then set aside to stand overnight. Next, the pH of the mixture was adjusted to 0.90 by dropwise addition of 12 N hydrochloric acid solution with vigorous stirring. This acidification resulted in precipitation of the product. The solid was collected by filtration and washed with several portions of aqueous methanol containing 70% methanol. The off-white solid was air dried and then dried under vacuum. The weight of dried solid was 52 g.

Polyguluronic acid reductively aminated with N,N,N',N'-tetrakis(2-aminoethyl)ethylenediamine
[PGA-penten]

The branched polyethylenimine, N,N,N',N'-tetrakis(2-aminoethyl)ethylenediamine (penten), in the amount of about 90 g, was prepared by the method of Wagnon and Jackels (Inorganic Chemistry, Vol.: 89, Page: 1924, Year: 1989). 100 g of polyguluronic acid and 40.0 g of penten were dissolved in 300 mL of deionized water contained in a one-liter beaker with stirring. An additional 48.0 g of penten was added to the solution with stirring. Next, the pH of the combined solution was adjusted to 9.00 by dropwise addition of 12 N hydrochloric acid solution with vigorous stirring. After deionized water was added to bring the total volume of the solution up 900 mL, the solution was set aside to stand at room temperature for 8 days. After standing for 8 days, the solution was transferred to a two-liter beaker. The rest of the procedure was identical to that used to prepare and isolate PGA-PEI$_{800}$. The weight of dried solid obtained using this procedure was 54 g.

Polyguluronic acid reductively aminated with polyethylenimine (MW=1300)
[PGA-PEI$_{1300}$]

100.0 g of polyguluronic acid and 55.0 g of polyethylenimine (Product Name: Lupasol G-20 water free; BASF; MW=1300) were dissolved in 300 mL of deionized water contained in a two-liter beaker with stirring. An additional 270.0 g of the same polyethylenimine was added to the solution with stirring. Next, the pH of the combined solution was adjusted to 8.95 by dropwise addition of 12 N hydrochloric acid solution with vigorous stirring. After the addition of hydrochloric acid solution, the solution was set aside to stand at room temperature for 10 days. As the solution was already contained in a two-liter beaker, no transfer was necessary prior to the addition of borohydride salts. The rest of the procedure was identical to that used to prepare and isolate PGA-PEI$_{800}$. The weight of dried solid obtained using this procedure was 57 g.

Polyguluronic acid reductively aminated with Starburst™ (PAMAM) Dendrimer, Generation 1
[PGA-StarburstG1]

The poly(amidoamine) dendrimer, Starburst™ (PAMAM) Dendrimer, Generation 1, was purchased as a 20 wt. % solution in methanol from the Aldrich Chemical Company, Inc. The molecular formula of this dendrimer is as follows: $[-CH_2N\{CH_2CH_2CONHCH_2CH_2N(CH_2CH_2CONHCH_2CH_2NH_2)_2\}_2]_2$. The methanol was removed, using a rotary evaporator, to yield the free amine as an oil in the amount of about 150 g. 100 g of polyguluronic acid and 55.0 g of Starburst™ (PAMAM) Dendrimer, Generation 1, were dissolved in 300 mL of deionized water contained in a two-liter beaker with stirring. An additional 92.0 g of Starburst™ (PAMAM) Dendrimer, Generation 1, was added to the solution with stirring. Next, the pH of the combined solution was adjusted to 9.05 by dropwise addition of 12 N hydrochloric acid solution with vigorous stirring. After deionized water was added to bring the total volume of the solution up 1000 mL, the solution was set aside to stand at room temperature for 9 days. As the solution was already contained in a two-liter beaker, no transfer was necessary prior to the addition of borohydride salts. The rest of the procedure was identical to that used to prepare and isolate PGA-PEI$_{800}$. The weight of dried solid obtained using this procedure was 53 g.

Pigment Dispersant J
PGA-PEI$_{800}$ reductively aminated with propionaldehyde
[PGA-PEI$_{800}$-(propyl)$_x$]

40.0 g of PGA-PEI$_{800}$ and 18.2 g of N,N-dimethylethanolamine were added to 450 mL of deionized water contained in a one-liter flask with stirring. The pH of the mixture was adjusted to 6.0 by dropwise addition of 3 N hydrochloric acid solution. Next, 30.0 g of propionaldehyde was added to the mixture. While stirring the mixture vigorously, 27.0 g of sodium cyanoborohydride was added in nine 3.0 g portions over a period of 18 hours. After each 3.0 g addition of sodium cyanoborohydride, the pH of the mixture was adjusted to 5.5 by the dropwise addition of 3 N hydrochloric acid solution. Soon after the initial addition of sodium cyanoborohydride, the mixture emulsified. After all of the sodium cyanoborohydride had been added, the mixture was set aside to stand for 12 hours. Next, while cooling the mixture using an ice bath, 12 N hydrochloric acid solution was added dropwise to the stirred mixture, contained within a well ventilated fume hood. This dropwise addition was continued until the pH of the mixture reached a value of 1.0. The addition of hydrochloric acid resulted in precipitation of an off-white solid. After setting the acidified mixed aside to stand for 12 hours, the solid was collected by filtration. The wet solid was washed with several portions of 95% ethanol. The wet solid was transferred to a one-liter flask along with 450 mL of deionized water. N,N-dimethylethanolamine was added dropwise to the stirred mixture until the pH of the resulting solution reached a value of 9.0. Next, while cooling the solution using an ice bath, 12 N hydrochloric acid solution was added dropwise to the stirred solution until the pH of the solution reached a value of 1.0. As before, this acidification resulted in the precipitation of an off-white solid. The solid was collected by filtration and was washed with several portions of 95% ethanol. The solid was air-dried and then dried to a constant weight under vacuum. A 250 mL flask was loaded with 30.0 g of the dried solid and 90.0 g of deionized water. While stirring the mixture vigorously, N,N-dimethylethanolamine was added in small portions. After most of the solid had dissolved, N,N-dimethylethanolamine was added dropwise while concurrently monitoring the pH of the solution. The addition of N,N-dimethylethanolamine was stopped when the solution pH reached a constant value of 6.0. Additional water was added such that a total solution weight of 136 g was obtained. For the final step, the resulting solution was filtered through a 3 micrometer teflon membrane filter.

Pigment Dispersant K
PGA-PEI$_{800}$ reductively aminated with acetone
[PGA-PEI$_{800}$-(isopropyl)$_x$]

40.0 g of PGA-PEI$_{800}$ and 18.2 g of N,N-dimethylethanolamine were added to 450 mL of deionized water contained in a one-liter flask with stirring. The pH of the mixture was adjusted to 6.0 by dropwise addition of 3 N hydrochloric acid solution. Next, 30.0 g of acetone was added to the mixture. While stirring the mixture vigorously, 27.0 g of sodium cyanoborohydride was added in nine 3.0 g portions over a period of 18 hours. After each 3.0 g addition of sodium cyanoborohydride, the pH of the mixture was adjusted to 5.5 by the dropwise addition of 3 N hydrochloric acid solution. Soon after the initial addition of sodium cyanoborohydride, the mixture emulsified. After all of the sodium cyanoborohydride has been added, the mixture was set aside to stand for 12 hours. The rest of the procedure was identical to that used to isolate PGA-PEI$_{800}$-(propyl)$_x$ and prepare an aqueous solution (136 g) of its N,N-dimethylethanolammonium salt. For the final step, the solution of the N,N-dimethylethanolammonium salt of PGA-PEI$_{800}$-(isopropyl)$_x$ was filtered through a 3 micrometer teflon membrane filter.

Pigment Dispersant L
PGA-penten reductively aminated with 2-octanone and then octanal
[PGA-penten-(1-methylheptyl)$_x$(1-octyl)$_y$]

40.0 g of PGA-penten and 18.2 g of N,N-dimethylethanolamine were added to 450 mL of deionized water contained in a one-liter flask with stirring. The pH of the mixture was adjusted to 6.0 by dropwise addition of 3 N hydrochloric acid solution. Next, 17.0 g of 2-octanone (purity: 98%) was added to the mixture. With the 2-octanone being sparingly soluble in water, a two-phase mixture was obtained. While stirring the mixture vigorously, 7.2 g of sodium cyanoborohydride was added in four 1.8 g portions over a period of 8 hours. After each 1.8 g addition of sodium cyanoborohydride, the pH of the mixture was adjusted to 5.5 by the dropwise addition of 3 N hydrochloric acid solution. Soon after the initial addition of sodium cyanoborohydride, the two-phase mixture emulsified. After all 7.2 g of the sodium cyanoborohydride had been added, the mixture was set aside to stand for 12 hours. Next, 20.0 g of octanal (purity:99%) was added to the emulsified mixture. While stirring the mixture vigorously, 5.4 g of sodium cyanoborohydride was added in three 1.8 g portions over a period of 6 hours. After each 1.8 g addition of sodium cyanoborohydride, the pH of the mixture was adjusted to 5.5 by the dropwise addition of 3 N hydrochloric acid solution. After all 5.4 g of the sodium cyanoborohydride had been added, the mixture was set aside to stand for 12 hours. The rest of the procedure was identical to that used to isolate PGA-PEI$_{800}$-(propyl)$_x$ and prepare an aqueous solution (136 g) of its N,N-dimethylethanolammonium salt. For the final step, the solution of the N,N-dimethylethanolammonium salt of PGA-penten-(1-methylheptyl)$_x$(1-octyl)$_y$ was filtered through a 3 micrometer teflon membrane filter.

Pigment Dispersant M
PGA-penten reductively aminated with cinnamaldehyde [PGA-penten-(cinnamyl)$_x$]

40.0 g of PGA-penten and 18.2 g of N,N-dimethylethanolamine were added to 450 mL of deionized water contained in a one-liter flask with stirring. The pH of the mixture was adjusted to 6.0 by dropwise addition of 3 N hydrochloric acid solution. Next, 31.0 g of trans-cinnamaldehyde (purity: 99%) was added to the mixture. With the cinnamaldehyde being sparingly soluble in water, a two-phase mixture was obtained. While stirring the mixture vigorously, 12.5 g of sodium cyanoborohydride was added in five 2.5 g portions over a period of 10 hours. After each 2.5 g addition of sodium cyanoborohydride, the pH of the mixture was adjusted to 5.5 by the dropwise addition of 3 N hydrochloric acid solution. Soon after the initial addition of sodium cyanoborohydride, the two-phase mixture emulsified. After all of the sodium cyanoborohydride had been added, the mixture was set aside to stand for 12 hours. The rest of the procedure was identical to that used to isolate PGA-PEI$_{800}$-(propyl)$_x$ and prepare an aqueous solution (136 g) of its N,N-dimethylethanolammonium salt. For the final step, the solution of the N,N-dimethylethanolammonium salt of PGA-penten-(cinnamyl)$_x$ was filtered through a 3 micrometer teflon membrane filter.

Pigment Dispersant N
PGA-PEI$_{1300}$ reductively aminated with formaldehyde [PGA-PEI$_{1300}$-(methyl)$_n$]

40.0 g of PGA-PEI$_{1300}$ and 18.2 g of N,N-dimethylethanolamine were added to 450 mL of deionized water contained in a one-liter flask with stirring. The pH of the mixture was adjusted to 6.0 by dropwise addition of 3 N hydrochloric acid solution. Next, 56.0 g of formalin (formaldehyde content: 37%) was added to the mixture. While stirring the mixture vigorously, 36.0 g of sodium cyanoborohydride was added in nine 4.0 g portions over a period of 18 hours. After each 4.0 g addition of sodium cyanoborohydride, the pH of the mixture was adjusted to 5.5 by the dropwise addition of 3 N hydrochloric acid solution. After all of the sodium cyanoborohydride had been added, the solution was set aside to stand for 12 hours. The rest of the procedure was identical to that used to isolate PGA-PEI$_{800}$-(propyl)$_x$ and prepare an aqueous solution (136 g) of its N,N-dimethylethanolammonium salt. For the final step, the solution of the N,N-dimethylethanolammonium salt of PGA-PEI$_{1300}$-(methyl)$_n$ was filtered through a 3 micrometer teflon membrane filter.

Pigment Dispersant O
PGA-StarburstG1 reductively aminated with acetaldehyde [PGA-StarburstG1-(ethyl)$_n$]

40.0 g of PGA-StarburstG1 and 18.2 g of N,N-dimethylethanolamine were added to 450 mL of deionized water contained in a one-liter flask with stirring. The pH of the mixture was adjusted to 6.0 by dropwise addition of 3 N hydrochloric acid solution. Next, 15.0 g of acetaldehyde pre-cooled to 5° C. was added to the mixture. While stirring the mixture vigorously, 18.0 g of sodium cyanoborohydride was added in six 3.0 g portions over a period of 12 hours. After each 3.0 g addition of sodium cyanoborohydride, the pH of the mixture was adjusted to 5.5 by the dropwise addition of 3 N hydrochloric acid solution. After all of the sodium cyanoborohydride had been added, the mixture was set aside to stand for 12 hours. The rest of the procedure was identical to that used to isolate PGA-PEI$_{800}$-(propyl)$_x$ and prepare an aqueous solution (136 g) of its N,N-dimethylethanolammonium salt. For the final step, the solution of the N,N-dimethylethanolammonium salt of PGA-StarburstG1-(ethyl)$_n$ was filtered through a 3 micrometer teflon membrane filter.

EXAMPLE 1

The components listed below are mixed, and the mixture is dispersed in a sand mill (manufactured by Yasukawa Seisaku-sho K.K.) containing glass beads (diameter: 1.7 mm) which have a combined weight one and a half times that of the mixture. Milling is carried out for a period of two hours.

| | |
|---|---|
| Raven 1170 Carbon Black (Columbian Chemicals; C.I. Pigment Black 7) | 5 wt. % |
| Pigment Dispersant A (25 wt. % solids) | 10 wt. % |
| glycerol | 15 wt. % |
| diethylene glycol | 5 wt. % |
| triethylene glycol mono-n-butylether | 2 wt. % |
| deionized water | 63 wt. % |

The glass beads are removed by filtration through a coarse stainless steel mesh. Next, undispersed particles are removed from the mixture by filtration through a 3 micron membrane filter, a process whereby an ink suitable for ink jet printing is obtained.

EXAMPLE 2

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Raven 1170 Carbon Black (Columbian Chemicals; C.I. Pigment Black 7) | 5 wt. % |
| Pigment Dispersant C (25 wt. % solids) | 10 wt. % |
| glycerol | 12 wt. % |
| diethylene glycol | 10 wt. % |
| 1-propanol | 3 wt. % |
| deionized water | 60 wt. % |

EXAMPLE 3

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Special Black 4A (Degussa; C.I. Pigment Black 7) | 5 wt. % |
| Pigment Dispersant B (25 wt. % solids) | 10 wt. % |
| glycerol | 15 wt. % |
| 1,5-pentanediol | 4 wt. % |
| diethylene glycol | 4 wt. % |
| tert-amyl alcohol | 1 wt. % |
| deionized water | 61 wt. % |

EXAMPLE 4

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Special Black 4A (Degussa; C.I. Pigment Black 7) | 5 wt. % |
| Pigment Dispersant D (25 wt. % solids) | 10 wt. % |
| diethylene glycol | 20 wt. % |
| 2-pyrrolidone | 4 wt. % |
| deionized water | 61 wt. % |

EXAMPLE 5

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Symuler Fast Yellow 4191N (Dainippon Ink; C.I. Pigment Yellow 74) | 2 wt. % |
| Pigment Dispersant C (25 wt. % solids) | 4 wt. % |
| glycerol | 15 wt. % |
| diethylene glycol | 10 wt. % |
| ethanol | 3 wt. % |
| deionized water | 66 wt. % |

EXAMPLE 6

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Fastogen Green S (Dainippon Ink; C.I. Pigment Green 7) | 2.5 wt. % |
| Pigment Dispersant D (25 wt. % sohds) | 5 wt. % |
| diethylene glycol | 20 wt. % |
| 2-propanol | 3.5 wt. % |
| deionized water | 69 wt. % |

EXAMPLE 7

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Symuler Brilliant Carmine (Dainippon Ink; C.I. Pigment Red 57:1) | 2 wt. % |
| Pigment Dispersant A (25 wt. % solids) | 4 wt. % |
| glycerol | 15 wt. % |
| 1,4-butanediol | 5 wt. % |
| diethylene glycol mono-n-butylether | 1.5 wt. % |
| deionized water | 72.5 wt. % |

EXAMPLE 8

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Fastogen Blue GNPR (Dainippon Ink; C.I. Pigment Blue 15:3) | 3 wt. % |
| Pigment Dispersant B (25 wt. % solids) | 6 wt. % |
| diethylene glycol | 18 wt. % |
| 1-propanol | 4 wt. % |
| deionized water | 69 wt. % |

EXAMPLE 9

The components listed below are mixed, and the mixture is dispersed in a sand mill (manufactured by Yasukawa Seisaku-sho K.K.) containing glass beads (diameter: 1.7 mm) which have a combined weight one and a half times that of the mixture. Milling is carried out for a period of two hours.

| | |
|---|---|
| Raven 1170 Carbon Black (Columbian Chemicals; C.I. Pigment Black 7) | 4 wt. % |
| Pigment Dispersant E (25 wt. % solids) | 8 wt. % |
| glycerol | 15 wt. % |
| diethylene glycol | 5 wt. % |
| deionized water | 68 wt. % |

After milling, the glass beads are removed by filtration through a coarse stainless steel mesh. Ninety-seven parts of the mixture are transferred to a beaker and diluted with three parts of 1-propanol. The combined mixture is stirred for 2 hours. Next, undispersed particles are removed from the mixture by filtration through a 3 micron membrane filter, a process whereby an ink suitable for ink jet printing is obtained.

EXAMPLE 10

The components listed below are mixed, and the mixture is dispersed in a sand mill as described in Example 9. Similarly, the post-milling treatment is the same as that described in Example 9. An ink suitable for ink jet printing is obtained.

| | |
|---|---|
| Raven 1170 Carbon Black (Columbian Chemicals; C.I. Pigment Black 7) | 4 wt. % |
| Pigment Dispersant F (25 wt. % solids) | 8 wt. % |
| glycerol | 15 wt. % |

| | |
|---|---|
| diethylene glycol | 5 wt. % |
| deionized water | 68 wt. % |

EXAMPLE 11

The components listed below are mixed, and the mixture is dispersed in a sand mill as described in Example 9. Similarly, the post-milling treatment is the same as that described in Example 9. An ink suitable for ink jet printing is obtained.

| | |
|---|---|
| Raven 1170 Carbon Black (Columbian Chemicals; C.I. Pigment Black 7) | 4 wt. % |
| Pigment Dispersant G (25 wt. % solids) | 8 wt. % |
| glycerol | 15 wt. % |
| diethylene glycol | 5 wt. % |
| deionized water | 68 wt. % |

EXAMPLE 12

The components listed below are mixed, and the mixture is dispersed in a sand mill as described in Example 9. Similarly, the post-milling treatment is the same as that described in Example 9. An ink suitable for ink jet printing is obtained.

| | |
|---|---|
| Raven 1170 Carbon Black (Columbian Chemicals; C.I. Pigment Black 7) | 4 wt. % |
| Pigment Dispersant H (25 wt. % solids) | 8 wt. % |
| glycerol | 15 wt. % |
| diethylene glycol | 5 wt. % |
| deionized water | 68 wt. % |

EXAMPLE 13

The components listed below are mixed, and the mixture is dispersed in a sand mill as described in Example 9. Similarly, the post-milling treatment is the same as that described in Example 9. An ink suitable for ink jet printing is obtained.

| | |
|---|---|
| Raven 1170 Carbon Black (Columbian Chemicals; C.I. Pigment Black 7) | 4 wt. % |
| Pigment Dispersant I (25 wt. % solids) | 8 wt. % |
| glycerol | 15 wt. % |
| diethylene glycol | 5 wt. % |
| deionized water | 68 wt. % |

EXAMPLE 14

The components listed below are mixed, and the mixture is dispersed in a sand mill as described in Example 9.

| | |
|---|---|
| Symuler Brilliant Carmine (Dainippon Ink; C.I. Pigment Red 57:1) | 2 wt. % |
| Pigment Dispersant G (25 wt. % solids) | 4 wt. % |
| glycerol | 15 wt. % |
| 1,4-butanediol | 5 wt. % |
| deionized water | 74 wt. % |

After milling, the glass beads are removed by filtration through a coarse stainless steel mesh. Ninety-seven parts of the mixture are transferred to a beaker and diluted with three parts of ethanol. The combined mixture is stirred for 2 hours. Next, undispersed particles are removed from the mixture by filtration through a 3 micron membrane filter, a process whereby an ink suitable for ink jet printing is obtained.

EXAMPLE 15

The components listed below are mixed, and the mixture is dispersed in a sand mill as described in Example 9.

| | |
|---|---|
| Fastogen Blue GNPR (Dainippon Ink; C.I. Pigment Blue 15:3) | 3 wt. % |
| Pigment Dispersant F (25 wt. % solids) | 6 wt. % |
| glycerol | 15 wt. % |
| diethylene glycol | 5 wt. % |
| deionized water | 71 wt. % |

After milling, the glass beads are removed by filtration through a coarse stainless steel mesh. Ninety-seven parts of the mixture are transferred to a beaker and diluted with three parts of 2-propanol. The combined mixture is stirred for 2 hours. Next, undispersed particles are removed from the mixture by filtration through a 3 micron membrane filter, a process whereby an ink suitable for ink jet printing is obtained.

EXAMPLE 16

The components listed below are mixed, and the mixture is dispersed in a sand mill as described in Example 9.

| | |
|---|---|
| Fastogen Blue GNPR (Dainippon Ink; C.I. Pigment Blue 15:3) | 3 wt. % |
| Pigment Dispersant E (25 wt. % solids) | 6 wt. % |
| glycerol | 12 wt. % |
| diethylene glycol | 8 wt. % |
| deionized water | 71 wt. % |

After milling, the glass beads are removed by filtration through a coarse stainless steel mesh. Ninety-seven parts of the mixture are transferred to a beaker and diluted with three parts of 1-propanol. The combined mixture is stirred for 2 hours. Next, undispersed particles are removed from the mixture by filtration through a 3 micron membrane filter, a process whereby an ink suitable for ink jet printing is obtained.

EXAMPLE 17

The components listed below are mixed, and the mixture is dispersed in a sand mill as described in Example 9. The post-milling treatment is the same as that described in Example 16. An ink suitable for ink jet printing is obtained.

| | |
|---|---|
| Symuler Fast Yellow 4191N (Dainippon Ink; C.I. Pigment Yellow 74) | 2 wt. % |
| Pigment Dispersant H (25 wt. % solids) | 4 wt. % |
| glycerol | 13 wt. % |
| diethylene glycol | 8 wt. % |
| deionized water | 73 wt. % |

EXAMPLE 18

The components listed below are mixed, and the mixture is dispersed in a sand mill as described in Example 9. The post-milling treatment is the same as that described in Example 14. An ink suitable for ink jet printing is obtained.

| | |
|---|---|
| Symuler Fast Yellow 4191N (Dainippon Ink; C.I. Pigment Yellow 74) | 2 wt. % |
| Pigment Dispersant I (25 wt. % solids) | 4 wt. % |
| glycerol | 13 wt. % |
| diethylene glycol | 8 wt. % |
| deionized water | 73 wt. % |

EXAMPLE 19

The components listed below were mixed, and the mixture was dispersed in an Eiger Motormill M250 VSE-EXJ (Eiger Japan, Tokyo, JAPAN). Glass beads (diameter: 1.0 mm), which had a total combined volume of 175 mL, were used as the milling media. Milling was carried out at 4000 rpm for a period of four hours.

| | |
|---|---|
| FW 18 (carbon black pigment; Degussa Corp.; C.I. Pigment Black 7) | 38 g |
| Pigment Dispersant J (22 wt. % solids) | 130 g |
| deionized water | 82 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

EXAMPLE 20

The components listed below were mixed, and the mixture was dispersed in an Eiger Motormill M250 VSE-EXJ as described in Example 19.

| | |
|---|---|
| FW 18 (carbon black pigment; Degussa Corp.; C.I. Pigment Black 7) | 38 g |
| Pigment Dispersant K (22 wt. % solids) | 130 g |
| deionized water | 82 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

EXAMPLE 21

The components listed below were mixed, and the mixture was dispersed in an Eiger Motormill M250 VSE-EXJ as described in Example 19.

| | |
|---|---|
| FW 18 (carbon black pigment; Degussa Corp.; C.I. Pigment Black 7) | 38 g |
| Pigment Dispersant L (22 wt. % solids) | 130 g |
| deionized water | 82 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

EXAMPLE 22

The components listed below were mixed, and the mixture was dispersed in an Eiger Motormill M250 VSE-EXJ as described in Example 19.

| | |
|---|---|
| FW 18 (carbon black pigment; Degussa Corp.; C.I. Pigment Black 7) | 38 g |
| Pigment Dispersant M (22 wt. % solids) | 130 g |
| deionized water | 82 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

EXAMPLE 23

The components listed below were mixed, and the mixture was dispersed in an Eiger Motormill M250 VSE-EXJ as described in Example 19.

| | |
|---|---|
| FW 18 (carbon black pigment; Degussa Corp.; C.I. Pigment Black 7) | 38 g |
| Pigment Dispersant N (22 wt. % solids) | 130 g |
| deionized water | 82 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

EXAMPLE 24

The components listed below were mixed, and the mixture was dispersed in an Eiger Motormill M250 VSE-EXJ as described in Example 19.

| | |
|---|---|
| FW 18 (carbon black pigment; Degussa Corp.; C.I. Pigment Black 7) | 38 g |
| Pigment Dispersant O (22 wt. % solids) | 130 g |
| deionized water | 82 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

COMPARATIVE EXAMPLE 1

The components listed below are mixed, and the mixture is dispersed in a sand mill as described in Example 1. Similarly, the post-milling treatment is the same as that described in Example 1. An ink suitable for ink jet printing is obtained.

| | |
|---|---|
| Raven 1170 Carbon Black (Columbian Chemicals; C.I. Pigment Black 7) | 5 wt. % |
| Joncryl 62 (SC Johnson Polymer; acrylic resin solution; 34 wt. % solids) | 12 wt. % |
| glycerol | 15 wt. % |
| diethylene glycol | 5 wt. % |
| 1-propanol | 3 wt. % |
| deionized water | 60 wt. % |

COMPARATIVE EXAMPLE 2

The components listed below are mixed, and the mixture is dispersed in a sand mill as described in Example 1. The polymer dispersant used in this example is a methyl methacrylate//methyl methacrylate/methacrylic acid block copolymer (MMA//MMA/MA) prepared according to the method described in U.S. Pat. No. 5,085,698. The block copolymer is neutralized with N,N-dimethylethanolamine and diluted such that a solution containing 25 wt. % solids is obtained.

| | |
|---|---|
| Raven 1170 Carbon Black (Columbian Chemicals; C.I. Pigment Black 7) | 20 wt. % |
| MMA//MMA/MA block copolymer (25 wt. % soli.ds) | 40 wt. % |
| diethylene glycol | 14 wt. % |
| deionized water | 26 wt. % |

The glass beads are removed by filtration through a coarse stainless steel mesh. One part of the dispersion is transferred to a beaker and diluted with three parts of 20 wt. % aqueous diethylene glycol solution. The combined mixture is stirred for 2 hours. Next, undispersed particles are removed from the mixture by filtration through a 3 micron membrane filter, a process whereby an ink for ink jet printing is obtained.

COMPARATIVE EXAMPLE 3

The components listed below were mixed, and the mixture was dispersed in an Eiger Motormill M250 VSE-EXJ as described in Example 19.

| | |
|---|---|
| FW 18 (carbon black pigment; Degussa Corp.; C.I. Pigment Black 7) | 38 g |
| Joncryl 62 (SC Johnson Polymer; acrylic resin solution; 34 wt. % solids) | 84 g |
| deionized water | 128 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

COMPARATIVE EXAMPLE 4

The components listed below were mixed, and the mixture was dispersed in an Eiger Motormill M250 VSE-EXJ as described in Example 19. The polymer dispersant solution used in this example was a butyl methacrylate//methacrylic acid block copolymer (BMA//MA; 10//10) prepared according to the method of PREPARATION 3 described in U.S. Pat. No. 5,085,698, except that n-butyl methacrylate was omitted from Feed II. The block copolymer was neutralized with N,N-dimethylethanolamine and diluted according to method of Procedure A of the same patent, yielding a solution which contained 25 wt. % solids and had a pH value of 8.4.

| | |
|---|---|
| FW 18 (carbon black pigment; Degussa Corp.; C.I. Pigment Black 7) | 38.0 g |
| BMA///MA block copolymer (25 wt. % solids) | 110.5 g |
| deionized water | 101.5 g |

After milling, 100 g of the dispersion was transferred to a beaker. The following components were added sequentially with stirring.

| | |
|---|---|
| glycerol | 30.0 g |
| 2-pyrrolidone | 15.0 g |
| diethylene glycol mono-n-butyl ether | 20.0 g |
| Surfynol 465 | 2.5 g |
| deionized water | 82.5 g |

The combined mixture was stirred for 2 hours. Next, the mixture was filtered through a 3 micron membrane filter, such that an ink suitable for ink jet printing was obtained.

Continuous Printing Test

The reliability under continuous printing conditions of the above inks is evaluated as follows. First, the ink is degassed and sealed in a heat-sealable aluminum pack. Next, the ink is loaded into the print head of an MJ-800C printer (Product Name, Seiko Epson Corporation). A line pattern which uses all of the nozzles is printed initially to establish that ink is being ejected from all nozzles with good directionality. The printing pattern is changed to one with intermittent solid blocks and an all nozzle line pattern. The combination pattern fills an A4 size sheet of paper. The block and line pattern is printed continuously with a printed sheet being evaluated every 100 sheets for evidence of loss of directionality, clogged nozzles, or decreases in optical density of the solids block (less than 5%). For Examples 1–18 and Comparative Example 2, no loss of directionality, no clogged nozzles, and no decreases in optical density are expected to be observed for 10,000 printed sheets. For Comparative Example 1, loss of directionality is expected to occur at less than 5000 sheets.

For Examples 19–24, no loss of directionality and no clogged nozzles were observed for 10,000 printed sheets. For Comparative Examples 3 and 4, loss of directionality occurred at less than 5000 sheets.

Intermittent Printing Test

The reliability under intermittent printing conditions of the above inks is evaluated as follows. First, the ink is degassed and sealed in a heat-sealable aluminum pack. Next, the ink is loaded into the print head of an MJ-800C printer. A line pattern which uses all of the nozzles is printed initially to establish that ink is being ejected from all nozzles with good directionality. The printing pattern is changed to one in which one drop is ejected from each nozzle successively, followed by a resting period during which the print head remains uncovered and no ink drops are ejected. This pattern, consisting of all nozzles one dot ejections followed by a rest period, is repeated successively with the length of the rest period increasing in units of 5 seconds. For example, the first rest period is 5 seconds, the second rest period is 10 seconds, the third rest period is 15 seconds, etc. The time interval of the rest period in which a nozzle first fails is recorded. For Examples 1–18 and Comparative Example 2, the minimum time interval before the first nozzle failure is expected to be greater than 90 seconds. For Comparative Example 1, the minimum time interval before failure is expected to be less than 60 seconds.

Long Term Storage Test

The reliability towards long term storage in the print head of the above inks is evaluated as follows. First, the ink is degassed and sealed in a heat-sealable aluminum pack. Next, the ink is loaded into the print head of an MJ-800C printer. A line pattern which uses all of the nozzles is printed initially to establish that ink is being ejected from all nozzles with good directionality. Next, the ink supply is removed from the print head, and then the print head was removed from the printer. The uncapped print head is stored for 7 days at 40° C. in a constant temperature oven. The print head is reattached to the printer and the ink supply is reattached to the print head. The cleaning operation of the printer is executed followed by a line pattern which uses all of the nozzles. The cleaning operation followed by the line pattern is repeated until all of the nozzles print with good directionality. The number of cleaning operations until all of the nozzles recover is recorded. For Examples 1–18 and Comparative Example 2, the number of cleaning operations necessary for full recovery is expected to be less than or equal to 3. For Comparative Example 1, full recovery of all the nozzles is not expected to be obtained even after 10 cleaning operations.

The ink compositions of Examples 19–24 and Comparative Examples 3 and 4 were evaluated in the same manner as described above except that 1) an MJ-510C printer (Product Name, Seiko Epson Corporation) was used; 2) the ink compositions were loaded into an ink cartridge for the printer; and 3) the ink supply (ink cartridge) was not removed from the print head during storage in the constant temperature oven. For Examples 19–24, the number of cleaning operations necessary for full recovery was less than or equal to 3. For Comparative Examples 3 and 4, full recovery of all the nozzles was not obtained even after 10 cleaning operations.

Thermal Cycling Test

The reliability towards two temperature extremes (−30° C. and 60° C.) of the above inks is evaluated as follows. First, the ink is degassed and sealed in a 30 mL glass sample bottle. The sample bottle is loaded into a 60° C. constant temperature oven and stored at that temperature condition for 24 hours. The sample is removed from the oven and transferred to a −30° C. constant temperature refrigerator and stored at that temperature condition for 24 hours. This two temperature cycle is repeated such that a total of ten cycles is completed. After the last cycle, the ink is thawed to room temperature, the glass sample bottle inverted without shaking, and the bottom of the sample bottle examined for precipitates. For Examples 1–18 and Comparative Example 2, no precipitates are expected to be observed. For Comparative Example 1, precipitate is expected to be observed.

For Examples 19–24, no precipitates were observed. For Comparative Examples 3 and 4, precipitates were observed.

Drying Time Test

The drying times of the above inks are evaluated by printing a series of solid block patterns and wiping the patterns in 10 second increments. The printing is carried out using an MJ-800C printer. The time in which the printed ink does not smear is recorded. For Examples 1–18 and Comparative Examples 1 and 2, the drying time is expected to be less than 30 seconds.

Printed Quality Test

Print quality, using an MJ-800C printer for Examples 1–18 and Comparative Examples 1 and 2 and an MJ-930C (Product Name, Seiko Epson Corporation) for Examples 19–24 and Comparative Examples 3 and 4, is evaluated in the following way. A standard set of Japanese Kanji characters are printed using a Gothic and a Minchou font at a 4 point character size. The samples are printed at 720 dpi. Four types of plain paper are used: Xerox 4024, Xerox R, Yamayuri, and Conqueror Laid. The print samples are evaluated using an optical microscope. The following standards are used to evaluate the print quality: the Kanji characters are sharp with no filling of interior voids within the characters (A), the Kanji characters are sharp, but there is some filling of the interior voids within characters with stroke counts greater than about 15 (B), the Kanji characters are not sharp and there is considerable filling of interior voids within characters with stroke counts greater than about 10 (NG). The expected results of the print quality tests for Examples 1–18 and Comparative Examples 1 and 2 are shown below in Table 1. The actual results of the print quality tests for Examples 19–24 and Comparative Examples 3 and 4 are also shown below in Table 1.

TABLE 1

| Sample | Colorant | Pigment Dispersant | Print Quality |
| --- | --- | --- | --- |
| Example 1 | C.I. Pigment Black 7 | Pigment Dispersant A | A |
| Example 2 | C.I. Pigment Black 7 | Pigment Dispersant C | A |
| Example 3 | C.I. Pigment Black 7 | Pigment Dispersant B | A |
| Example 4 | C.I. Pigment Black 7 | Pigment Dispersant D | A |
| Example 5 | C.I. Pigment Yellow 74 | Pigment Dispersant C | A |
| Example 6 | C.I. Pigment Green 7 | Pigment Dispersant D | A |
| Example 7 | C.I. Pigment Red 57:1 | Pigment Dispersant A | A |
| Example 8 | C.I. Pigment Blue 15:3 | Pigment Dispersant B | A |
| Example 9 | C.I. Pigment Black 7 | Pigment Dispersant E | A |
| Example 10 | C.I. Pigment Black 7 | Pigment Dispersant F | A |
| Example 11 | C.I. Pigment Black 7 | Pigment Dispersant G | A |
| Example 12 | C.I. Pigment Black 7 | Pigment Dispersant H | A |
| Example 13 | C.I. Pigment Black 7 | Pigment Dispersant I | A |
| Example 14 | C.I. Pigment Red 57:1 | Pigment Dispersant G | A |
| Example 15 | C.I. Pigment Blue 15:3 | Pigment Dispersant F | A |
| Example 16 | C.I. Pigment Blue 15:3 | Pigment Dispersant E | A |
| Example 17 | C.I. Pigment Yellow 74 | Pigment Dispersant H | A |
| Example 18 | C.I. Pigment Yellow 74 | Pigment Dispersant I | A |
| Example 19 | C.I. Pigment Black 7 | Pigment Dispersant J | A |
| Example 20 | C.I. Pigment Black 7 | Pigment Dispersant K | A |
| Example 21 | C.I. Pigment Black 7 | Pigment Dispersant L | A |
| Example 22 | C.I. Pigment Black 7 | Pigment Dispersant M | A |
| Example 23 | C.I. Pigment Black 7 | Pigment Dispersant N | A |
| Example 24 | C.I. Pigment Black 7 | Pigment Dispersant O | A |
| Comp. Ex. 1 | C.I. Pigment Black 7 | acrylic resin | NG |
| Comp. Ex. 2 | C.I. Pigment Black 7 | MMA//MMA/MA block colypolmer | B |
| Comp. Ex. 3 | C.I. Pigment Black 7 | acrylic resin | NG |
| Comp. Ex. 4 | C.I. Pigment Black 7 | BMA//MA (10//10) block copolymer | NG |

What is claimed is:

1. A pigment dispersed aqueous ink jet ink composition comprising:
   (a) water as the principal solvent;
   (b) a pigment;
   (c) a pigment dispersant wherein the dispersant is a derivative of a polyuronic acid in which a hydrophobic polymer is covalently attached to the reducing terminus of the polyuronic acid.

2. The ink composition of claim 1 wherein the polyuronic acid comprises 1,4-linked polygalacturonic acid, polyguluronic acid, polyiduronic acid, or mixed polymers thereof.

3. The ink composition of claim 1 wherein the hydrophobic polymer is a homopolymer or copolymer prepared from at least one monomer selected from the group consisting of styrene or substituted styrenes, vinyl pyridine or substituted vinyl pyridines, methacrylic acid esters, acrylic acid esters, acrylonitrile, methacrylonitrile, butadiene, and isoprene.

4. The ink composition of claim 1 wherein the hydrophobic polymer comprises poly(dimethylsiloxane).

5. The ink composition of claim 1 wherein the hydrophobic polymer is a polyamide.

6. The ink composition of claim 5 wherein the polyamide is an N-acylated derivative of a polyamine, with the polyamine being one in which greater than 50% of the amine functionalities are either primary or secondary amines.

7. The ink composition of claim 6 wherein the polyamine is selected from the group of polyamines consisting of linear polyethylenimines, branched polyethylenimines, polyallylamine, poly(N-alkyl)allylamines, and polyvinylamine.

8. The ink composition of claim 6 wherein the acyl groups, R—(CO)—, of the polyamide comprise at least one selected from the following acyl groups: $C_nH_{(2n+1)}$—(CO)—, in which n is greater than or equal to 3; phenyl-(CO)—; substituted phenyl-(CO)—; phenyl-$CH_2$—(CO)—; substituted phenyl-$CH_2$—(CO)—; phenyl-$C_2H_4$—(CO)—; and substituted phenyl-$C_2H_4$—(CO)—.

9. The ink composition of claim 1 wherein the hydrophobic polymer is a hydrophobic polyamine.

10. The ink composition of claim 9 wherein the hydrophobic polyamine is a poly-N-alkylated derivative of a water soluble polyamine.

11. The ink composition of claim 10 wherein the water soluble polyamine is selected from the group of water soluble polyamines consisting of polyethylenimines, polyallylamines, polyvinylamines, poly(propylene imine) dendrimers, and poly(amidoamine) dendrimers.

12. The ink composition of claim 1 wherein said ink contains 0.1 to 10% pigment, 0.1 to 20% pigment dispersant, and 70 and 99.8% aqueous carrier medium.

13. The ink composition of claim 1 wherein the number average molecular weight of the polyuronic acid segment is greater than or equal to 700.

14. The ink composition of claim 1 wherein the number average molecular weight of the hydrophobic polymer segment is greater than or equal to 300.

15. The ink composition of claim 1 wherein the polyuronic acid segment of the pigment dispersant is neutralized with a neutralizing agent selected from the group consisting of organic bases, alkanolamines, alkali metal hydroxides, and mixtures thereof.

16. A printing method comprising depositing an ink composition of claim 1 onto a recording medium.

17. An ink jet printing method comprising ejecting and depositing droplets of an ink composition of claim 1 onto a recording medium.

18. A recorded medium recorded by the method of claim 16.

19. A polyuronic acid derivative comprising a polyuronic acid in which a hydrophobic polymer is covalently attached to the reducing terminus of the polyuronic acid.

20. The polyuronic acid derivative of claim 19, wherein the number average molecular weight of the polyuronic acid segment is greater than or equal to 700.

21. The polyuronic acid derivative of claim 19, wherein the number average molecular weight of the hydrophobic polymer segment is greater than or equal to 300.

22. A dispersant comprising the polyuronic acid derivative of claim 19.

* * * * *